(12) United States Patent
Bolnick et al.

(10) Patent No.: US 8,868,641 B2
(45) Date of Patent: Oct. 21, 2014

(54) SYSTEM, METHOD AND COMPUTER PROGRAM PRODUCT FOR GATHERING AND DELIVERING PERSONALIZED USER INFORMATION

(75) Inventors: David A. Bolnick, Seattle, WA (US); Robert M. Krauthamer, Seattle, WA (US); Steven Esses, Brooklyn, NY (US)

(73) Assignee: Onederland Technology LLC, Las Vegas, NV (US)

( * ) Notice: Subject to any disclaimer, the term of this patent is extended or adjusted under 35 U.S.C. 154(b) by 435 days.

(21) Appl. No.: 12/755,594

(22) Filed: Apr. 7, 2010

(65) Prior Publication Data

US 2010/0299388 A1 Nov. 25, 2010

Related U.S. Application Data

(63) Continuation of application No. 09/829,937, filed on Apr. 11, 2001, now Pat. No. 7,725,523.

(60) Provisional application No. 60/218,852, filed on Jul. 13, 2000, provisional application No. 60/196,082, filed on Apr. 11, 2000.

(51) Int. Cl.
*G06F 15/16* (2006.01)
*G06Q 30/02* (2012.01)

(52) U.S. Cl.
CPC .................................... *G06Q 30/02* (2013.01)
USPC ........... 709/203; 709/217; 709/202; 709/201; 707/792

(58) Field of Classification Search
USPC .................... 709/203, 217, 202, 201; 707/792
See application file for complete search history.

(56) References Cited

U.S. PATENT DOCUMENTS

| 5,555,303 | A | | 9/1996 | Stambler |
| 5,664,115 | A | | 9/1997 | Fraser |
| 5,802,499 | A | * | 9/1998 | Sampson et al. ................ 705/35 |
| 5,821,508 | A | | 10/1998 | Willard |
| 6,034,605 | A | * | 3/2000 | March ........................ 340/573.1 |
| 6,057,835 | A | | 5/2000 | Sato et al. |
| 6,154,729 | A | | 11/2000 | Cannon et al. |
| 6,161,149 | A | * | 12/2000 | Achacoso et al. ................ 710/4 |
| 6,175,833 | B1 | | 1/2001 | West et al. |
| 6,182,068 | B1 | | 1/2001 | Culliss |
| 6,205,553 | B1 | | 3/2001 | Stoffel et al. |
| 6,266,420 | B1 | | 7/2001 | Langford et al. |
| 6,317,783 | B1 | | 11/2001 | Freishtat et al. |

(Continued)

OTHER PUBLICATIONS

"www.my.yahoo.com" Dec. 12, 1998, downloaded from http://web.archive.org/web/19981212031215/http/Iwww.my.yahoo.com, 4 pages.

(Continued)

*Primary Examiner* — Lan-Dai T Truong

(57) ABSTRACT

A system, method and computer program product for providing a secure data channel between a user and associates. The method may receive pushed information from an associate, including, e.g., an update to the user profile information, related information, or personalized content for the user. The method can convey to the user, personal information including a selectable union of the user profile information, the related information, and/or the personalized content. The method can further share access to the personal information to a family, where the family can include another user, users, or multiple related users. The pushed information can include textual, digitized audio, digitized video, graphical image, or other data, and can include prescription, automobile service, or purchased product information, or voicemail messages.

26 Claims, 19 Drawing Sheets

(56) References Cited

U.S. PATENT DOCUMENTS

| | | | |
|---|---|---|---|
| 6,327,570 | B1 | 12/2001 | Stevens |
| 6,408,282 | B1 | 6/2002 | Buist |
| 6,466,941 | B1 | 10/2002 | Rowe et al. |
| 6,484,196 | B1 | 11/2002 | Maurille |
| 6,515,681 | B1 | 2/2003 | Knight |
| 6,615,238 | B1 | 9/2003 | Melet et al. |
| 6,714,944 | B1 | 3/2004 | Shapiro et al. |
| 6,735,624 | B1 | 5/2004 | Rubin et al. |
| 6,745,238 | B1 | 6/2004 | Giljum et al. |
| 6,807,538 | B1 | 10/2004 | Weinberger et al. |
| 6,820,204 | B1 | 11/2004 | Desai et al. |
| 6,862,612 | B1 | 3/2005 | Horn et al. |
| 6,901,434 | B1 | 5/2005 | Lunsford et al. |
| 6,931,419 | B1 * | 8/2005 | Lindquist ............... 707/792 |
| 7,103,563 | B1 | 9/2006 | Voisin et al. |
| 7,305,562 | B1 | 12/2007 | Bianco et al. |
| 2001/0011245 | A1 | 8/2001 | Duhon |
| 2001/0013547 | A1 | 8/2001 | Kotob et al. |
| 2001/0027472 | A1 | 10/2001 | Guan |
| 2001/0032215 | A1 * | 10/2001 | Kyle et al. ............... 707/505 |
| 2002/0016734 | A1 | 2/2002 | McGill et al. |
| 2002/0046084 | A1 | 4/2002 | Steele et al. |
| 2002/0062270 | A1 | 5/2002 | Star |
| 2003/0036975 | A1 | 2/2003 | Martin et al. |
| 2003/0097161 | A1 | 5/2003 | Firlik et al. |
| 2007/0015667 | A1 | 1/2007 | Ellenberger |
| 2008/0243721 | A1 * | 10/2008 | Joao ...................... 705/36 R |
| 2009/0198806 | A1 * | 8/2009 | Kim et al. ............... 709/222 |
| 2011/0307816 | A9 * | 12/2011 | Barnett et al. ........... 715/767 |

OTHER PUBLICATIONS

"www.my.yahoo.com" Mar. 31, 2001, downloaded from http://web.archive.orglweb/20010331180659/http:IImy.yahoo.com, 2 pages.

Official Action in U.S. Appl. No. 09/829,937 dated Dec. 2, 2004, 11 pages.

Response to Official Action in U.S. Appl. No. 09/829,937 dated Dec. 2, 2004, mailed Jun. 1, 2005, 14 pages.

Official Action in U.S. Appl. No. 09/829,937 dated Aug. 11, 2005, 11 pages.

Response to Official Action in U.S. Appl. No. 09/829,937 dated Aug. 11, 2005, mailed Jan. 13, 2006, 8 pages.

Official Action in U.S. Appl. No. 09/829,937 dated May 19, 2006, 15 pages.

Response to Official Action in U.S. Appl. No. 09/829,937 dated May 19, 2006, mailed Aug. 23, 2006, 10 pages.

Official Action in U.S. Appl. No. 09/829,937 dated Nov. 14, 2006, 14 pages.

Response to Official Action in U.S. Appl. No. 09/829,937 dated Nov. 14, 2006, mailed Feb. 20, 2007, 15 pages.

Official Action in U.S. Appl. No. 09/829,937 dated May 21, 2007, 16 pages.

Response to Official Action in U.S. Appl. No. 09/829,937 dated May 21, 2007, mailed Sep. 21, 2007, 27 pages.

Official Action in U.S. Appl. No. 09/829,937 dated Jan. 9, 2008, 29 pages.

Response to Official Action in U.S. Appl. No. 09/829,937 dated Jan. 9, 2008, mailed Apr. 9, 2008, 24 pages.

Official Action in U.S. Appl. No. 09/829,937 dated Jul. 9, 2008, 33 pages.

Response to Official Action in U.S. Appl. No. 09/829,937 dated Jul. 9, 2008, mailed Oct. 9, 2008, 27 pages.

Official Action in U.S. Appl. No. 09/829,937 dated Aug. 26, 2009, 6 pages.

Response to Official Action in U.S. Appl. No. 09/829,937 dated Aug. 26, 2009, mailed Oct. 26, 2009, 20 pages.

Notice of Allowability in U.S. Appl. No. 09/829,937 dated Nov. 12, 2009, 13 pages.

* cited by examiner

SYSTEM, METHOD AND COMPUTER PROGRAM PRODUCT FOR GATHERING AND DELIVERING PERSONALIZED USER INFORMATION

CROSS-REFERENCE TO RELATED APPLICATION

The present application is a continuation of U.S. application Ser. No. 09/829,937, filed Apr. 11, 2001, which claims priority to related U.S. Provisional Appl. No. 60/218,852, filed Jul. 13, 2000, and U.S. Provisional Appl. No. 60/196,082, filed Apr. 11, 2000, each of which are incorporated by reference in the present application in their entireties. The present application thus claims the benefit of priority of U.S. application Ser. No. 09/829,937 and U.S. Provisional Appl. Nos. 60/218,852 and 60/196,082.

BACKGROUND OF THE INVENTION

1. Field of the Invention

The present invention relates generally to consumer information, and more particularly to centralized distribution of personalized user information.

2. Related Art

Manufacturers, distributors and retailers of consumer products conventionally maintain private information about consumers and the products they purchase. For example, when a consumer purchases a product such as, e.g., a car, from a manufacturer, a car dealer will capture information from the consumer, which can be forwarded on to a manufacturer. Such information can be manually keyed in or delivered in a digital form to a database of the manufacturer. Some other vital information related to the product is unknown to the consumer. From time to time, such information could be used by the consumer. Unfortunately, however, there is no convenient, conventional way for the consumer to get this information. For example, the consumer may be interested in the warranty term remaining on the car that the consumer purchased. No conventional convenient means exists to provide this information to the consumer.

With the advent of the Internet, information portals have been provided to provide information to consumers. Unfortunately, conventional information portals are designed to provide information to consumer users in a general format. Conventionally, portals will request user profile information from a user to categorize the user as belonging to a particular group or "profile." Based on the user's profile, the portal such as, e.g., http://www.my.yahoo.com, can deliver information to the user. For example, if the user provides to the portal that the user is interested in Microsoft stock, then the portal can deliver articles about Microsoft to the user. This information is broadcast to all consumer users identifying an interest in Microsoft stock. Thus, conventional information portals do not provide a personalized result to the user. Another example of information that is conventionally provided is weather information. For weather information, the user states a city of interest and the portal broadcasts weather information to the user and others, which have stated an interest in the city.

Conventional information portals, since they broadcast only general information to consumer users, suffer from disloyal users, i.e., users of one portal will often switch to another portal on a whim. Conventional portals provide general information for broadcast to a mass market of users by profile category. This general information is easily retrievable from other portals. Users desire personalized information not provided by conventional portals. Such information can be related to the users' personal preferences and past purchases. An improved method of providing information to users is desired that overcomes the shortcomings of conventional information portals.

A conventional information portal is illustrated in block diagram 100 of FIG. 1A. Specifically, block diagram 100 includes a user 102 interacting with portal 104, via, for example, a computer, phone, or other access device (i.e., not shown) such as, e.g., an interactive television (TV), a wireless device, etc. User 102 can be a consumer purchaser of a product that was manufactured by, e.g., a manufacturer 108. User 102 can purchase the product directly from the manufacturer 108 or indirectly via, e.g., a wholesaler, distributor, reseller, or retailer, collectively referred to as an association or associate 108. Other users 102 can include, e.g., any purchaser of a product, a purchasing representative or other employee of a business.

User 102 is shown conveying user profile information 110 to information portal component 104. For example, the user 102 could, e.g., subscribe to an online portal account at a portal such as, e.g., http://www.my.yahoo.com, requiring entry of certain personal user profile information 110.

As shown in diagram 100, information portal 104 can then make a general request 112 for information from a content provider 106. In response to the general request 112 for information, content provider 106 can provide information 114 by general profile category to portal 104, as also illustrated in diagram 100. Portal 104 can then broadcast 116 such information by general profile category to users 102, which belong to the general profile category having interest in such general information.

In one embodiment, portal 104 and content provider 106 can be part of the same entity, collectively referred to as entity 120.

In one embodiment, the user 102 can provide information such as, e.g., user personal information 118, to an associate manufacturer 108, or other organization or business (such as, e.g., a retailer, distributor, agency, governmental entity, non-profit entity, and other associate). The information 118 can be in the form of an information response card to the manufacturer 108, which could then be keyed into a data processing system. Alternatively, the information could be provided electronically or via other manual or automated means. Note that line 118 is unidirectional representing this information is conveyed to the manufacturer 108. There is other information that would be useful in the hands of a consumer, which remains extremely difficult to access at, e.g., a manufacturer or other associate 108. Although some of this useful information may be available elsewhere, e.g., at a website where the user may have inputted and stored some information, (although much valuable information is not available to the customer), it can be buried deep within various unrelated sites requiring separate logins with potentially separate usernames, interfaces and passwords. Thus, it would be desirable to have a more easily accessible centralized access to useful personal information related to a consumer user or customer.

Associate 108 can manually key-in the information appearing on a response card provided by user 102. Response card information can typically include various types of information such as, e.g., demographic information about the user 102, information about a particular type and model of product purchased, distribution channel used, and other information such as, satisfaction of the user 102 with the product. A cleansing process can be performed on the keyed-in data to ensure the accuracy of the entered data. The keyed-in response card data can be placed in electronic form by data entry clerks by categories. For example, data can be inserted into fields of a database record of a database. The keyed response card information (i.e., if prepared by a third party) can then be provided to the associate 108. If received by the associate 108 from a third party, the associate 108 may perform further cleansing also. The associate 108 could import the data, parse the data, store the data for later use, or discard the data when aged beyond a threshold date. Some associates 108 may choose not to input the registration information to a database at all. Unfortunately such valuable information of users 102 available to associate 108, is conventionally inaccessible to portals 104 and also unfortunately, is inaccessible to users 102.

FIG. 1B illustrates in further detail, in flow diagram 124, an example interaction between user 102, portal 104 and content provider 106, as depicted in block diagram 100.

Specifically, diagram 124 begins with step 126 and continues immediately with step 128. In step 128, user 102 conveys user profile information to the portal 104 via, some means such as, e.g., an electronic communication or e-mail. The diagram 124 then continues as shown with step 130.

In step 130, portal 104 assigns a group profile category or multiple categories to the user 104. Group categories can include, e.g., various demographic and psychographic attributes, and other areas of interest, including, e.g., gender, age, categorical interests, hobbies, etc. From step 130, diagram 124 continues with step 132.

In step 132, portal 104 can store the user profile information 110 and can add to the profile any of various group profile categories with which the user 102 could possibly be interested. Group profiles could include, e.g., investors in a given company or residents of a zip code or a city. Such broad group profiles might be assigned based on stereotypical interests associated with other users 102 having similar profiles to the user profile information 110 provided by user 102. From step 132, diagram 124 continues with step 134.

In step 134, portal 104 can generate a query 134 for information by group profile category to content providers 106 in order to request 112 information of interest to the general profile categories assigned in step 130 to the users 102 of portal 104. From step 134, diagram 124 continues with step 136.

In step 136, the content provider 106 can obtain content from time to time that is relevant to a particular group profile category. For example if a group profile category was shareholders of Microsoft Corporation stock, then, when an article related to Microsoft is published by a wire service, this article, or content, would be available for delivery to users of the Microsoft shareholder group profile category. From step 136, diagram 124 continues with step 138.

In step 138, the content provider 106 can convey the content relevant to the group profile category, referred to now as "group profile focused content" to the portal 140. From step 138, the diagram 124 continues with step 140.

In step 140, the portal 104 can then provide the group profile focused content to users 102 which were assigned in step 132 to the group profile category to which the content is relevant. Thus, for the article about Microsoft, the portal 104 can convey the article to the Microsoft shareholder users 102. This is essentially a broadcast of information to the user 102. The information is general information assumed to be relevant to the user 102, merely based upon the group profile category assigned in step 130. From step 140, diagram 124 continues with step 142.

In step 142, the user 102 can review the group focused content conveyed by the portal 140. Unfortunately, much of this broadcasted group focused content is of little interest to the user 102, since the user 102 may not have the broad stereotypical interests of the assigned general categories. Unfortunately, conventional portals 104 do not provide personalized information of direct interest to the users 102. Thus, if a user 102 chooses to "opt-out" of irrelevant content from the portal 104, the user 102 may opt out of useful, desired and relevant information when trying to only opt out of the irrelevant content. From step 142, diagram 124 ends immediately with step 144.

It is therefore desirable that an improved method, system and computer program product be provided for enabling personalized information to be generated and conveyed to users. The computer program product may be embodied on a computer usable medium and include program logic.

SUMMARY OF THE INVENTION

An exemplary embodiment of the present invention includes a method, system, and computer program product for providing a secure data channel between a user and one or more associates, including receiving at a processing server, from the user, user profile information, user identification, a user acceptance, family definitions, sharing controls, and/or a hardware signature; receiving pushed information from the one or more associates (e.g., a business, or organization), including an update to the user profile information, related information, or personalized content for the user; and conveying, to the user, personal information including a selectable union of the user profile information, the related information, and/or the personalized content. The personal information in an exemplary embodiment can be referred to as a personal information report (PIR). In an exemplary embodiment, the hardware signature can be generated and sent by an application that can be downloaded from the processing server to user.

In an exemplary embodiment of the invention, the conveyance step can convey information to the user using, e.g., a web interface, an interactive voice response (IVR) system, a wireless access device, a communications device, an interactive television (TV) device, a palm-top computing device, a synchronized device, a personal digital assistant, a computing device or another device having a direct and/or indirect access to the Internet.

In an exemplary embodiment of the invention, the method can further include sharing access to the personal information to an individual user or a family. In an exemplary embodiment, the family can include another user a multiple users, or multiple related users.

In an exemplary embodiment of the invention, the associate can include an affiliated association, an unaffiliated association, or another association. In an exemplary embodiment of the invention, the associations can include, e.g., a manufacturer, a distributor, a retailer, an non-profit, a service provider, a sports franchise, an information provider, a news agency, a content provider, a television program, a movie, an entertainment event, or an agency.

In an exemplary embodiment of the invention, the method can further include providing cumulative aggregate user profile information to the association.

In an exemplary embodiment of the invention, the pushed information can include, e.g., textual data, digitized audio data, digitized video data, graphical image data, and/or other data.

In an exemplary embodiment of the invention, the pushed information can include, e.g., prescription information, automobile service information, purchased product information, travel reservation information, sports information, TV programming information, deductions information charitable contribution information, encrypted information, financial information, membership information, educational information, voicemail messages, and/or any information related to the user.

In an exemplary embodiment of the present invention, a system is disclosed for providing a secure data channel between a user and associates including a database including user profile information, user identification, user acceptance, sharing controls, and/or a hardware signature; multiple associates that convey updates of the user profile information, related information, and pushed personalized content into the database; and a component that provides a selectable union of the pushed personalized content with the user profile information for conveyance to a user.

In another exemplary embodiment, a computer program product is disclosed for enabling a computer to display an associates list to a user according to the present invention.

In yet another exemplary embodiment, a computer program product is disclosed including an instant message application to enable display of an associates list to a user.

In another embodiment, an inflight entertainment portal is disclosed including a user interface operative to display an associates list to a user, including pushed personalized content relating to the user.

In an exemplary embodiment, an application-based, applet based, browser-based, or other form of application-based computer program product can be provided.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE INVENTION

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Figure 1A:
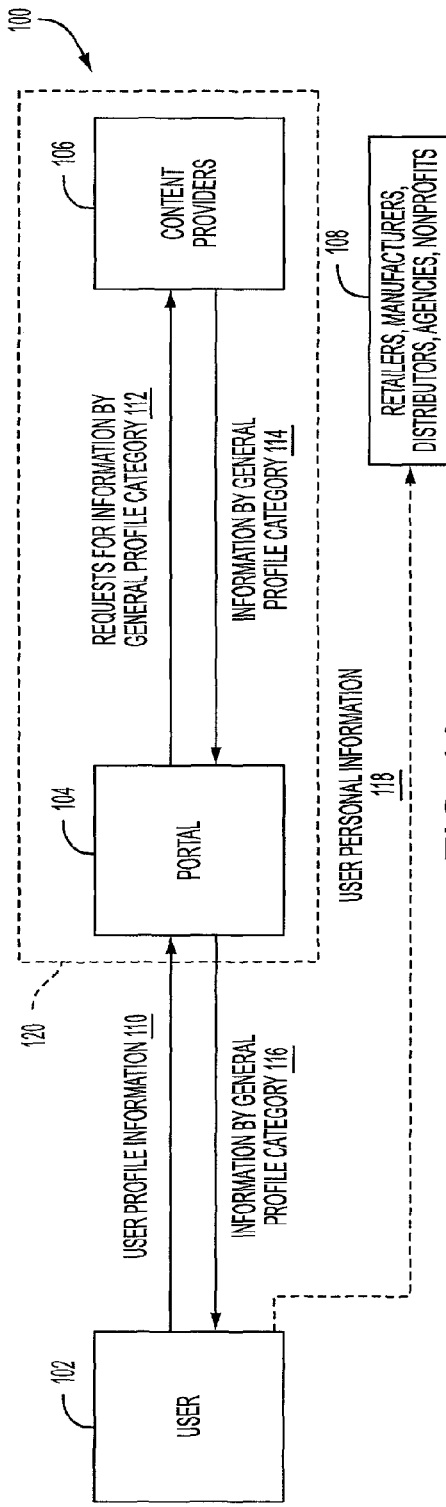
FIG. 1A depicts a high-level block diagram illustrating an example of a user interaction with a portal.

FIG. 1A depicts, as described above, a high-level block diagram 100 illustrating an example of interaction between a user 102 and a portal 104.

Figure 1B:
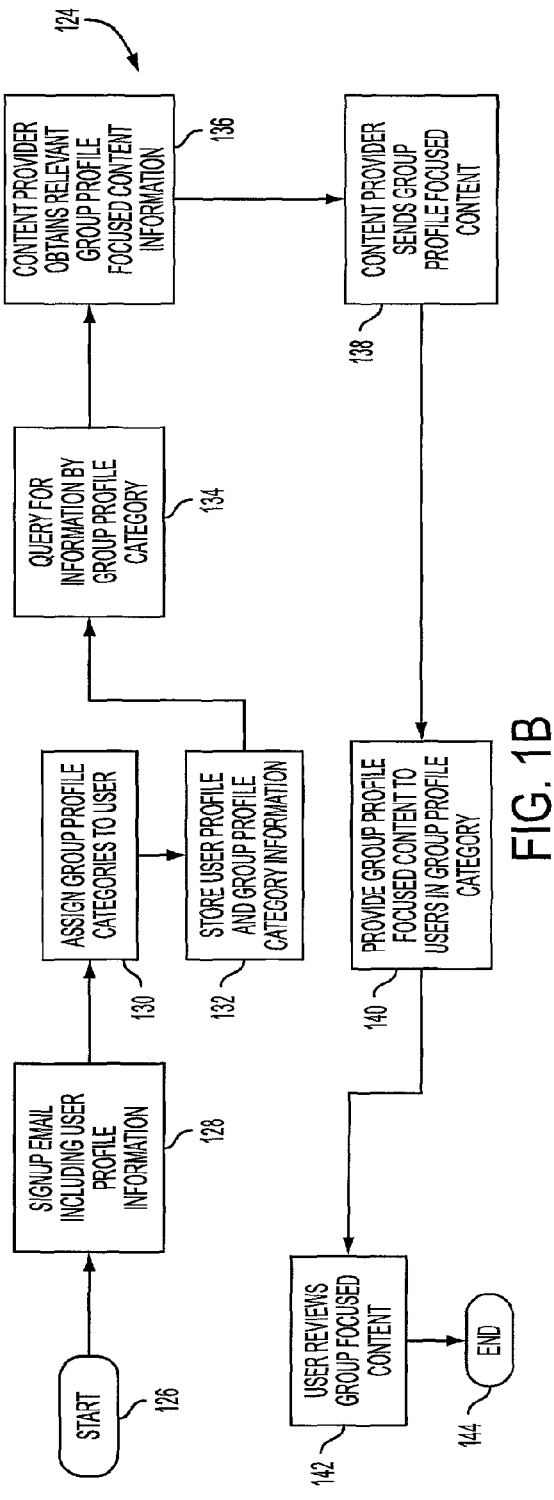
FIG. 1B depicts a more detailed flow diagram illustrating a user interaction with a portal.

FIG. 1B depicts a more detailed flow diagram 124 illustrating a detailed example interaction between a user 102 and the portal 104.

Figure 1C:
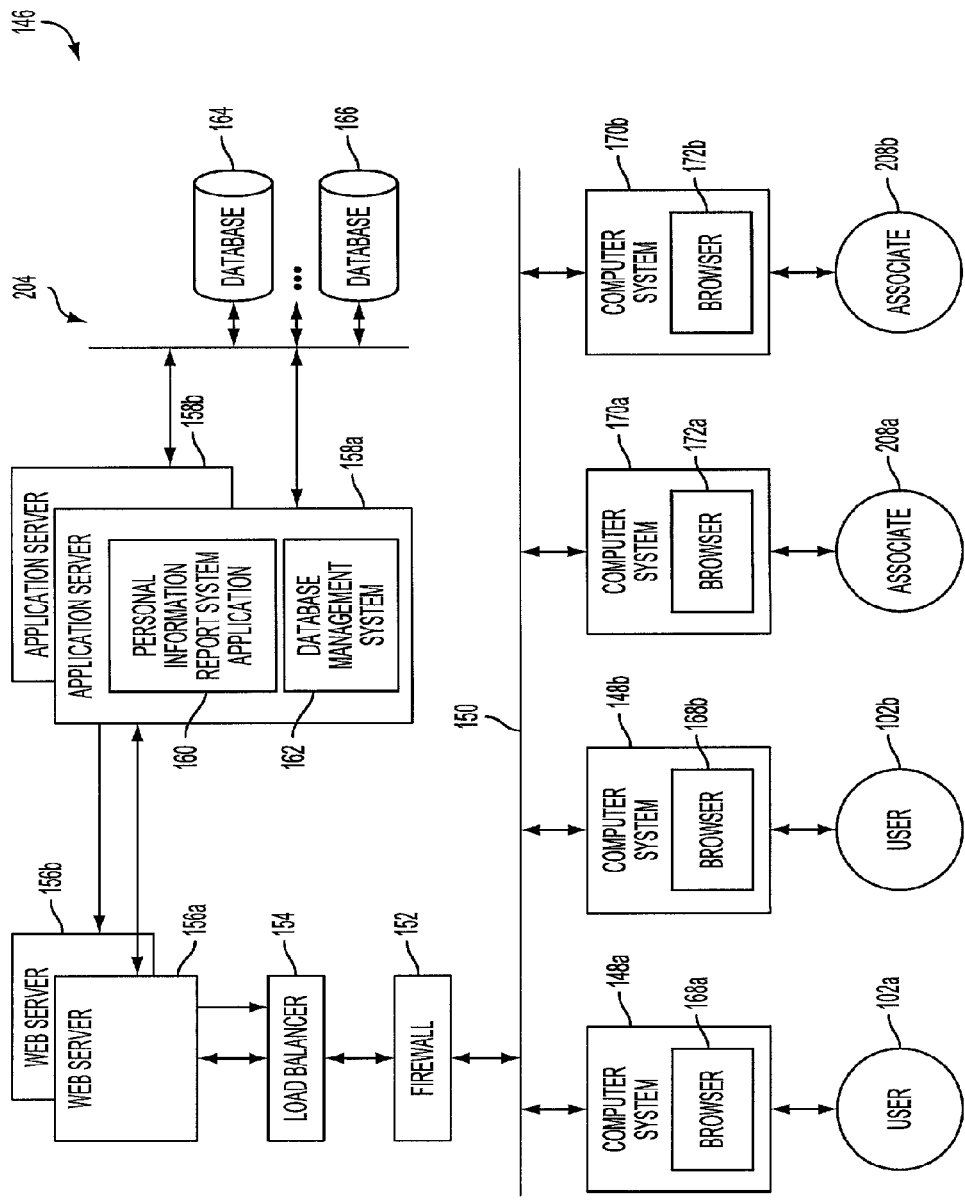
FIG. 1C depicts a block diagram of an exemplary embodiment of a real-time social network service provider according to the present invention.

FIG. 1C depicts a block diagram 146 of an exemplary embodiment of a secure data channel between a user and associates referred to herein, in an exemplary implementation embodiment as a real-time social network (RTSN) service provider. In an exemplary embodiment, block diagram 146 can include users 102a, 102b interacting with, e.g., computer systems 148a, 148b via, e.g., browsers 168a, 168b computer systems 148a, 148b can be coupled via network 150 to exemplary RTSN service provider 204. Associates 208a, 208b can interact with computer systems 118a, 118b via e.g., browsers 172a, 172b. Computer systems 170a, 170b can be coupled via network 150 to RTSN service provider 204.

RTSN service provider 204, as shown, can include one or more webservers 156a, 156b can be coupled to network 150 by a firewall 152 and load balancer 154. Webservers 156a, 156b can be coupled to one or more application servers 158a, 158b. Application servers 158a, 158b can execute applications such as, e.g., application programs 160, 162. Application 160 can be a personal information report (PIR) system application 160 that can generate various reports according to the present invention. Application 162 can be a database management system (DBMS) 162, which can manage database, such as, e.g., databases 164, 166.

Figure 2:
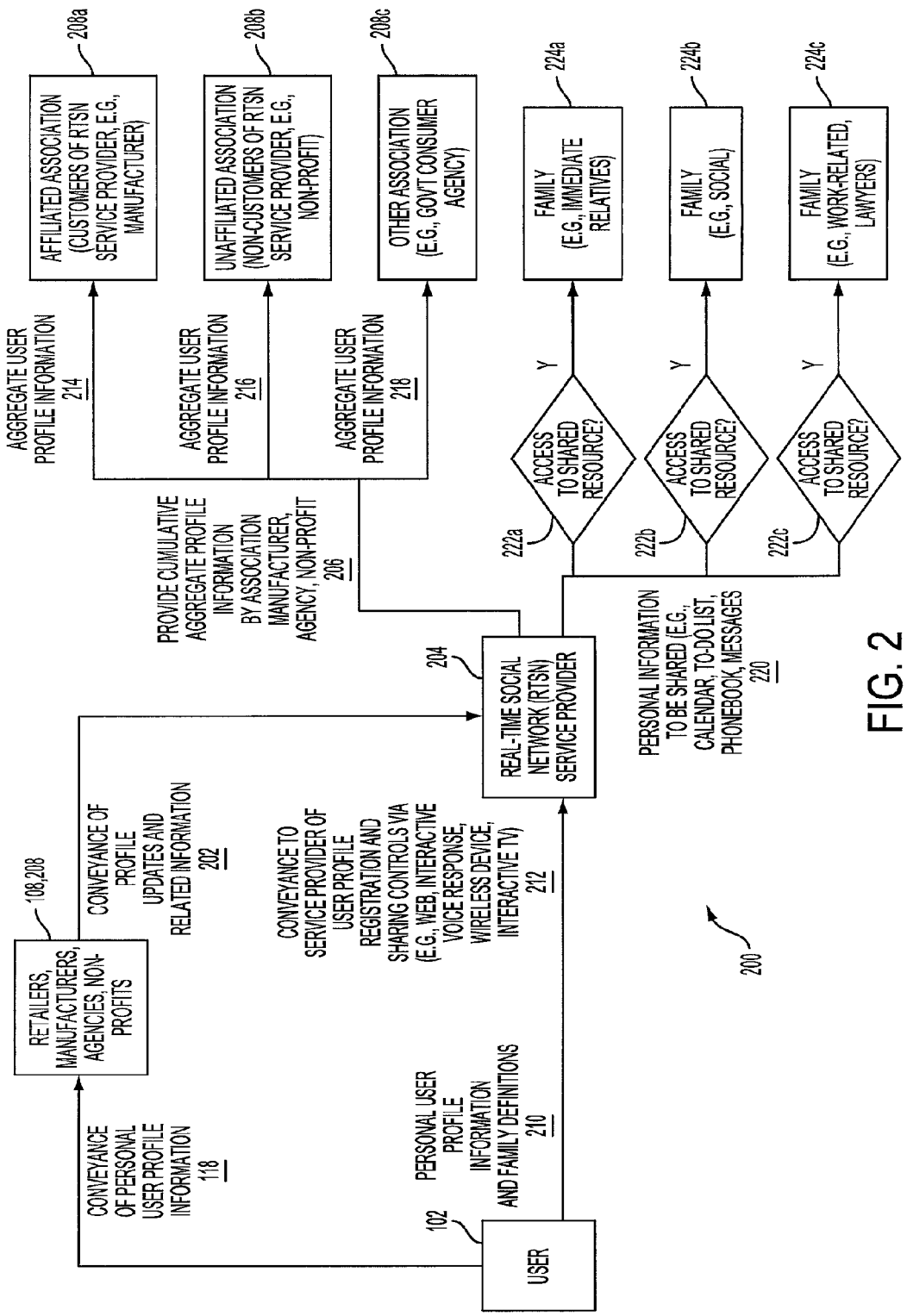
FIG. 2 depicts a block diagram illustrating an exemplary embodiment of an improved method by which a user can provide information and associates can convey personalized information to a real-time social network for conveyance to the user according to the present invention.

FIG. 2 depicts a block diagram 200 illustrating an exemplary embodiment of an improved method by which a user 102 can provide user profile registration information. Block diagram 200 also illustrates how retailers, manufacturers, agencies, and non-profits, collectively associates 108, 208 can convey information related to the user 102 to a real-time social network service provider 204 database 164, 166.

Block diagram 200 in an exemplary embodiment, illustrates a system including a user 102 and a real-time social network service provider 204. Block diagram 200 can further include associations 208a, 208b, and 208c and families 224a, 224b, and 224c. The block diagram 200 can include a real-time social network service provider 204 database 164,166 that can receive user profile information and family definitions in step 210 and sharing controls conveyed in step 212. Multiple associations 108, 208 can in step 202 convey updates of the user profile information, and related information. The RTSN 204 can in step 206 provide cumulative aggregate profile information by associate. Specifically, affiliated association 208a can be conveyed aggregate user profile information in step 214. Similarly, for unaffiliated association 208b and other association 208c, aggregate user profile information 216 and 218 can be conveyed, respectively. Block diagram 200 can also include families 224a, 224b, and 224c and determinations of shared access 222a, 222b, and 222c which can allow personal information such as, e.g., a calendar, a to-do list, an address book and messages, to be shared as shown in step 220.

Figure 3:
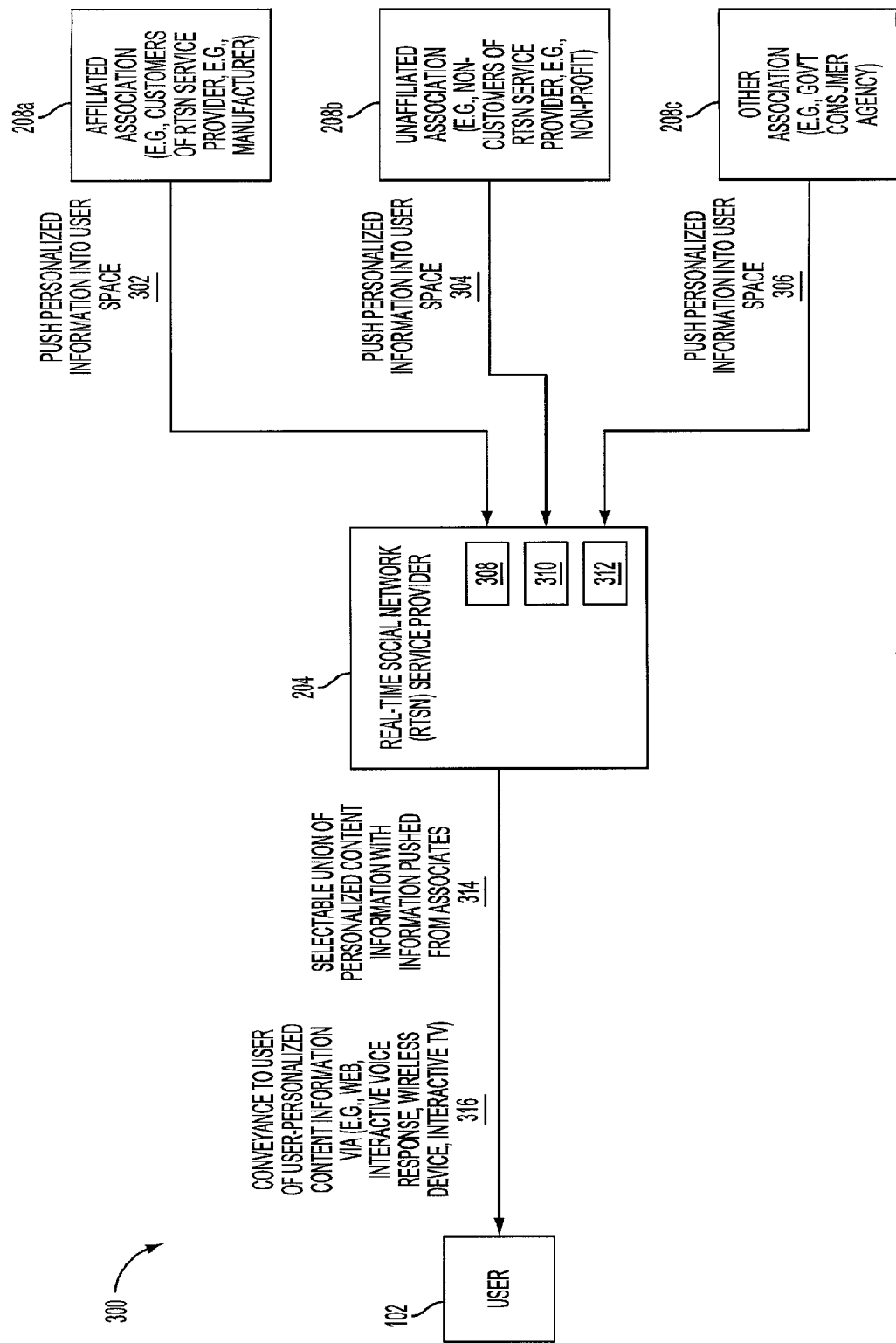
FIG. 3 depicts an exemplary embodiment of a conveyance of a selectable union of personalized content information with information pushed from associates according to the present invention.

FIG. 3 depicts a block diagram 300 illustrating an exemplary embodiment of the present invention, including the real-time social network (RTSN) service provider 204 conveying in step 314 a selectable union of personalized content information with information pushed in steps 302, 304 and 306 from associates 208a, 208b, and 208c, respectively. Block diagram 300 can include database locations 308, 310 and 312 of RTSN 204 into which associates 208a, 208b and 208c, respectively, can advantageously push personalized information for users 102. Associations 208a, 208b, and 208c, in an exemplary embodiment can continually push personalized content information as shown by steps 302, 304, and 306 into the real-time social network service provider 204 database 164, 166. In step 314 the real-time social network (RTSN) service provider 204 database 164, 166 can provide a selectable union of the personalized content pushed in steps 302, 304, and 306, with the user profile information 210 for conveyance to the user 102, or for personal information to be shared as shown in step 220 according to sharing controls conveyed in step 212, to users 102 of a family 224a, 224b, and 224c of users 102 for which access is shared using access determinations 222a, 222b, and 222c.

An exemplary embodiment of the present invention can include a method, system, and computer program product for providing the real-time social network 204, including receiving at the real-time social network 204, from a user 102, user profile information and/or family definitions as illustrated in step 210, and/or sharing controls as shown in step 212. The method can receive as shown in step 202 user profile updates and related information from an associate 208, which could have been provided to the associate 108 by the user 102 as shown by the conveyance of step 118, or could have already been within the possession of associates 108, 208 but possibly inaccessible by user 102. Associates 208 can also send information such as, e.g., an update to the user profile information, and/or related information as shown in step 202. Associates 208a, 208b, and 208c are also shown in FIG. 3 providing or "pushing" in steps 302, 304, and 306 personalized content for the user 102. The RTSN 204 is shown conveying, to the user 102, in step 314 personal information including a selectable union of the user profile information, the related information, and/or the pushed personalized content from associates 208a, 208b and 208c.

In one exemplary embodiment of the invention, step 316 illustrates the RTSN 204 conveying user-personalized content to the user 102 using, e.g., a web interface, an interactive voice response (IVR) system, a wireless access device, an interactive television (TV) device, a computing device, a communication device, a palm top computing device, a personal digital assistant (PDA), or another access device.

In an exemplary embodiment of the invention, the RTSN 204 can further share access to the personal information to users 102 of a family 222a-c. In an exemplary embodiment, the family 222a-c can include e.g., another user, multiple users, or multiple related users.

In an exemplary embodiment of the invention, the associates 208 can include, e.g., at an affiliated association 208a, an unaffiliated association 208b, or an other association 208c. In an exemplary embodiment of the invention, the associations 208 can include, e.g., a manufacturer, a distributor, a retailer, an non-profit, or an agency.

In an exemplary embodiment of the invention, the method can provide cumulative aggressive profile information by association as shown in step 206 and can further include as illustrated in steps 214, 216, and 218 providing aggregate user profile information to associations 208a-c, respectively.

In an exemplary embodiment of the invention, the pushed information can include, e.g., textual data, digitized audio data, digitized video data, graphical image data, or other data.

In an exemplary embodiment of the invention, the pushed information can include, e.g., prescription information, automobile service information, purchased product information, travel reservation information, sports information, deductions information charitable contribution information, encrypted information, financial information, membership information, educational information, voicemail messages, or other useful information.

Figure 4:
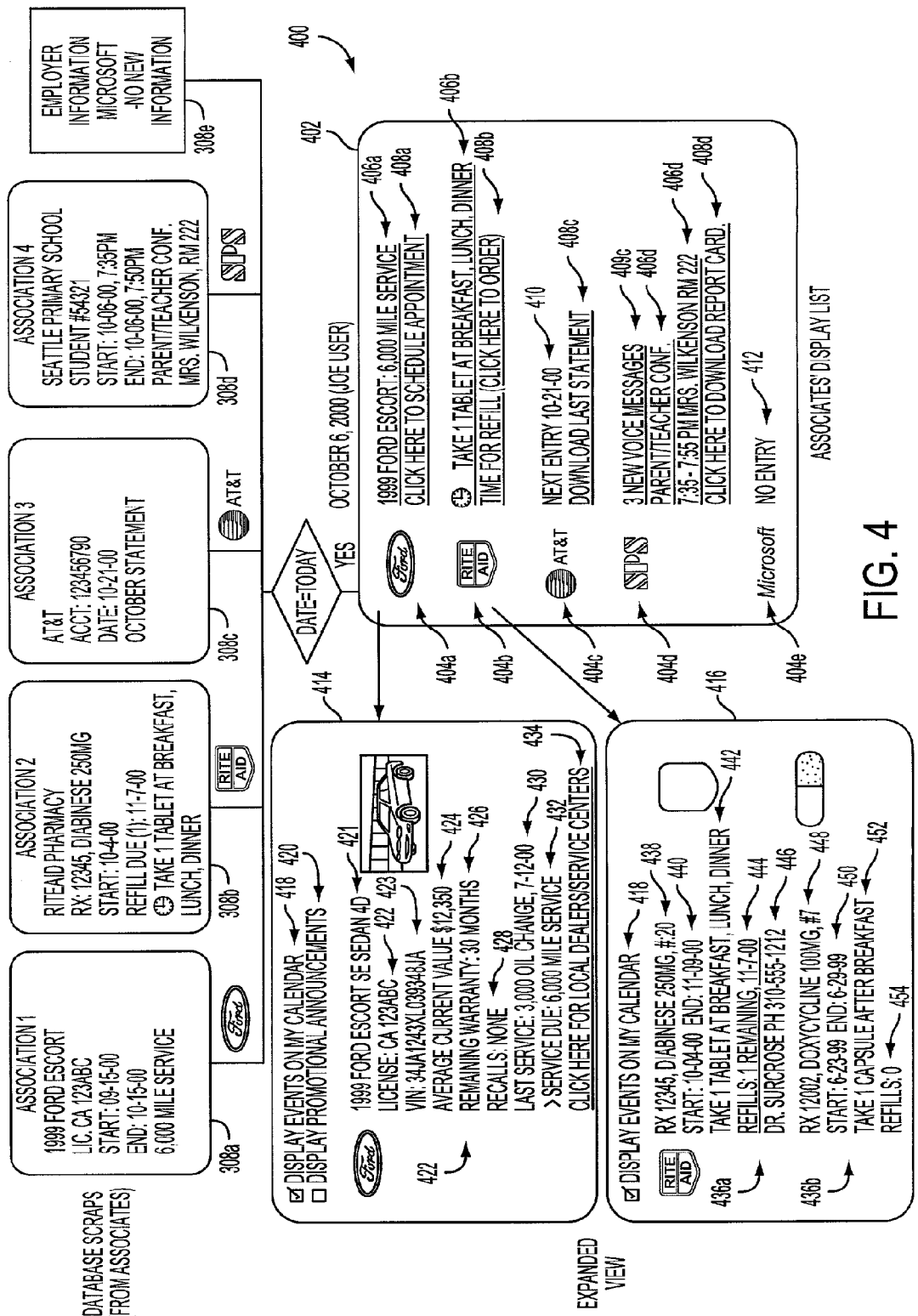
FIG. 4 depicts a block diagram illustrating an exemplary embodiment of an associates dynamic database of the real-time social network (RTSN) of the present invention.

FIG. 4 depicts a block diagram 400 illustrating an exemplary embodiment of an associates dynamic database of the real-time social network (RTSN) of the present invention.

Figure 5:
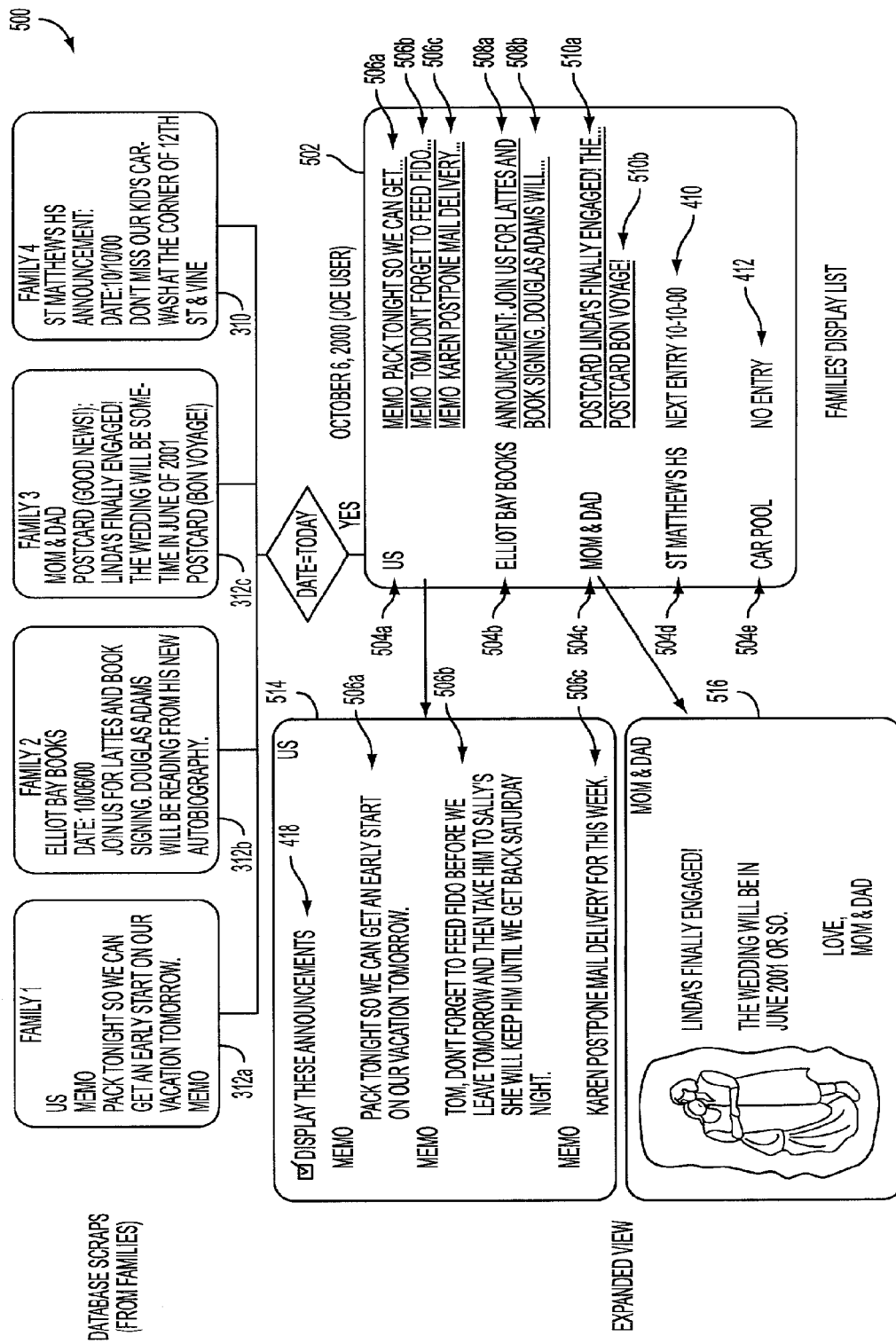
FIG. 5 depicts a block diagram illustrating an exemplary embodiment of a families' dynamic database schematic according to the present invention.

FIG. 5 depicts a block diagram 500 illustrating an exemplary embodiment of a families' dynamic database schematic.

Figure 6:
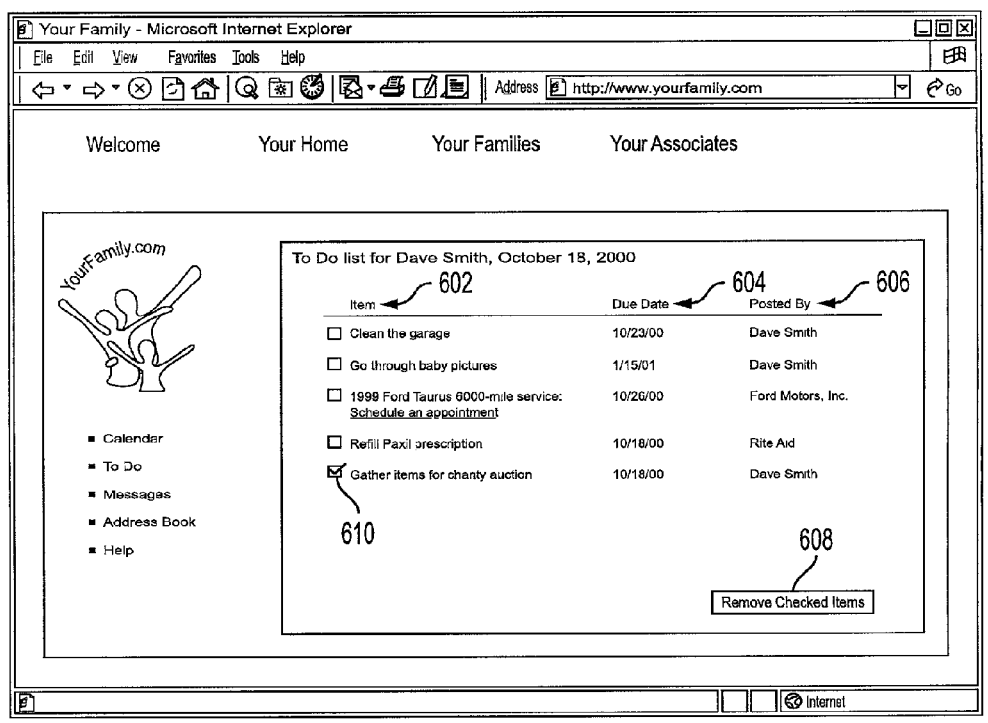
FIG. 6 depicts an exemplary embodiment of a your home to-do view list user interface according to the present invention.

FIG. 6 depicts a block diagram 600 illustrating an example embodiment of a your home to-do view user interface of the present invention.

The Real-Time-Social-Network™ ("RTSN") service provider 204 allows users 102 to become organized and to obtain answers to questions of concern to the users 102. Users 102 can organize people, businesses, and organizations that they associate with in a secure network environment via access devices such as, e.g., interactive TV, wireless Web devices, and on the Web.

As users 102 of the RTSN 204 become accustomed to checking daily, e.g., personal daily schedules, to-do lists, phone or address books, messages, or answers to their recently asked questions, businesses and organizations can advantageously "push" personal information report (PIRs) discussed further below, and can integrate individualized client data into the daily routine of the user 102. This "pushed" data can be desired rather than undesired because the data is useful information which can come from businesses and organizations associates 208a-c that the user 102 is already associated with.

Almost any type of scheduled (i.e., time critical) data can be delivered to users 102 by associate providers 208 (such as, e.g., businesses and organizations). However, the type of information that can provide the greatest benefit for both users 102 and associate providers 208 is information that can help reduce the burden of product support and customer service, that has a regular schedule, and that fosters a long-term trusted relationship.

Business Model

The foundation of the business model of RTSN service provider 204, is built upon three strategies:
  sale of associate member accounts to associate providers for their customers and members,
  advertising, and
  sponsorships.

In an exemplary embodiment, a primary revenue stream for the RTSN service provider can arise from the bulk sale of associate member accounts to businesses and organizations. Associate providers 208 can assign account numbers to an individual customer 102 so that the associate 208 can personalize data to be "pushed" into the account of the user 102.

Users 102 can generate revenue, accruing to the RTSN, each time they patronize an associate 208 company that has signed on as an associate provider 208. For example, a user 102, John Smith, can buy a Ford and can opt to use the RTSN 204 site. Thus, the user's relationship with associate provider 208 Ford can result in revenue to RTSN 204. Assume user 102 John is also a frequent flyer on three airlines, each of which is an associate provider 208. John can also be a Knicks fan and can enjoy fishing. If the Knicks and Field & Stream magazine are associate providers 208, John's various relationships can now be generating revenue for RTSN 204 from multiple associate revenue streams.

The approach, where associate providers 208 can comfortably insert themselves into a user 102 customer's daily life can be a win-win relationship for both user customer 102 and the associate provider 208 business. The approach can provide customer users 102 with various services including, e.g., personalized up-to-the-minute information, group announcements, the ability to post questions to other users customers, and on-line voting.

The approach can offer associate providers 208 various services as well, including, e.g., aggregate customer profiling, persistent branding, customer support reduction, customer service/profile surveys, paper reduction due to on-line delivery of mass notifications, hardcopy surveys and voting, and the ability to resale customer accounts. Above all, the approach can foster customer loyalty and trust known in the industry as "stickiness."

Exemplary Uses for Associate Providers' of a
Real-Time-Social-Network™ Service Provider Any media with personalized content is applicable in this context. Illustrative examples include, e.g.:

A phone company delivering voice mail (graphic slides can be added to this, see voicemail demo at http://www.yourfamily.com/v-mail/msg001.asf);

An automobile manufacturer delivering specific consumer information and scheduled service reminders (see diagram of FIG. 4);

A pharmacy providing a medication schedule and a reminder when to order refills (see diagram of FIG. 4);

A sports franchise placing game schedules on a fans personal calendar and alerting them to seat availability that fits into the member's profile; and A school reminding parents of their time slot at a parent-teacher conference and allowing them to download a student's report card (see diagram of FIG. 4).

Exemplary Uses for Users of a
Real-Time-Social-Network™ Service Provider

Illustrative examples include, e.g.:
Organizing who will pick up the kids after school;
Creating a list of things to do for the church picnic;
Finding a current phone number for a family member who keeps moving;
Viewing bowling league scores;
Reading the block association's newsletter; and
Asking advice about what's a good refrigerator to buy.

A benefit of the RTSN 204 is to humanize the Web so as to serve real-life, day-to-day, complex and seemingly conflicting needs of people.

The RTSN 204 is building a strong presence internationally, including, e.g., in the United States, Europe, Latin America, and Japan. In another exemplary embodiment, localized versions, as well as, e.g., wireless Web, interactive television, interactive voice response (IVR), hand held, and other versions can be provided.

Detailed Overview of an Exemplary Embodiment of
the Invention

FIGS. 4 and 5 depict block diagrams 400 and 500 of exemplary embodiments of the "push" data flow of a Real-Time-Social-Network™ (RTSN) service provider 204. In both cases, data are pushed onto a Real-Time-Social-Network™ server from various sources.

In FIG. 4, block diagram 400 illustrates an exemplary embodiment where data from associate businesses and organizations 308 can be integrated into member's display list of a user 102. Here, 4 associate providers 308a, 308b, 308c and 308d of the 5 associate providers 308a-308e have pushed fresh client data onto the Real-Time-Social-Network™ 204 server (represented by the top 4 squares 308a-308d). The pushed data can then be integrated into an associate display list 402 including, e.g., display items 404a-e (represented by square 402) if the data matches the date criteria. The user 102 can then see a detailed view 414, 416 of any list item 404a, 404b, 404c, 404d and 404e (represented by the 2 squares 414 and 416). Note, e.g., that the user 102 can choose using feature 418 to have scheduled data automatically appear on their personal calendars. Diagram 400 demonstrates the flow of data from an associate provider 208a, 208b and 208c, and depicts exemplary of value added aspects of the Real-Time-Social-Network™ service provider 204.

The associates' list 402 includes an automotive service reminder 406a, an automotive service request 408a. Selecting the automobile associate icon 404a can open the pop-up window 414 that can provide personalized information 422 such as, e.g., automobile type 421, license plate or registration information 422, vehicle information number (VIN) 423, an estimate bluebook value 424, remaining warranty period 426, recalls 428, a record from the last service visit 430, next service milestone 432, and a dealer locator 434.

Selection of pharmacy associate icon 404*b* can open pop-up window 416 that can provide personalized prescription information 436*a*, 436*b*. Prescription 436*a* can include, e.g., the prescription identifier and drug name 438, start date and end date 440, instructions 442, remaining refills 444, prescribing physician and contact information 446.

Telephone service associate icon 404*c* can include new items 410, 408*c*, and 490*c*.

School associate icon 404*d* can have entries 406*d*, 408*d*.

Employer associate icon 404*e* can include entries or an indication of no new entries 412.

FIG. 5 illustrates diagram 500 including an example embodiment of the invention including family data. Exemplary family database entries 312*a*, 312*b* and 312*c*, and 310 can be shown in a Families' Display list 502 as shown. For each family icon 504*a*, 504*b*, 504*c*, 504*d* and 504*e* can have new items 506*a-c*, 508*a*, 510*a-b*, 410 and 412. Selection of family icon 504*a* can open an electronic bulletin board 514 including memos 506*a-c*. Selection of icon 504*c* can provide pop-up window 516 including family news.

Real-Time-Social-Network™ service provider 204 is intended to be the most widely used personal information application for Web and wireless Web devices with strong global presence in the United States, Europe, Latin America, and Japan.

- Businesses can gain the unique ability to communicate with their active customers on an individual basis. This approach can reduce the demand on customer support and increase brand loyalty.
- Organizations can be able to create a more cohesive membership through the sharing of vital information like an up-to-the-minute phone directory, calendar of events, and announcements.
- Families, which are much the same as small organizations, can also find value in the ability to share selected portions of a family member's phone book or calendar and to easily share all manner of information with each other.
- Individuals are the focal point of the Real-Time-Social-Network™ which can serve to humanize technology so as to serve the real-life, day-to-day, complex and seemingly conflicting needs of average people.

Components of the RTSN

Most people's lives are defined by a set of associations and daily interactions with the members of their many families. The Real-Time-Social-Network™ 204 technology can connect aspects of an individual's daily life.

An advantage of the Real-Time-Social-Network™ 204 is the network's ability to create an "addictive" environment where members return to the site several times daily to review schedules, look up phone numbers, see announcements, ask advise, buy/sell/trade, and review interesting information from their associate providers.

This approach where associate providers 208 can comfortably insert themselves into a daily life of a user 102 is a win-win relationship for both user 102 and associate 208:

For example, a user 102 can get from associate provider 208:

- Personalized, branded, up-to-the-minute information that can be seen as value added (e.g., airline flight and seating status, video rental return notices, voice-mail, on-premises service and delivery reminders, etc.),
- Personalized, branded, data (e.g., account statements, order status, customer profile, etc.),
- Group, branded, announcements (e.g., recall notices, product upgrades, damage control, inclement weather closures, etc.),
- The ability to post questions to other customers, if the associate provider chooses this option (e.g., Can I tow a Honda Accord with automatic transmission behind my RV? Which is a better layover route from JFK to SeaTac—Chicago or San Francisco?, and
- On-line voting; and for example, an associate provider 208 can receive from the sponsorship:

- Timely, aggregate, customer profiling compiled from registration data and association choices,
- Persistent branding on the site and "pushed" announcements,
- Customer support reduction (by providing the customer with answers to the most often asked questions via personalized, branded, data—see above),
- Customer service/profile surveys (product and services feedback),
- Paper reduction due to on-line delivery of mass notifications (e.g., annual share-holder reports, recall notices, change of terms, etc.),
- Cost reduction to hardcopy surveys and voting,
- Customer loyalty and trust (i.e., being a positive part of a customer's daily life)
- Relevant Web links on account records, and
- Ability to resale account to customers.

The following four integrated components are the heart of the site. All components can be accessible on wireless Web devices as well as the Web and initially in, e.g., English, French, Spanish, German, and Japanese. The new site can follow W3C/WAI accessibility guidelines, where possible, making it consistent with, e.g., the ADA (American's with Disabilities Act) needs of corporations and government agencies.

Welcome

Welcome is the site's general home page where a user 102 logs on or obtains information about registering as a user member 102. From the Welcome page the user 102 can log on/off, register, or find help about the site.

Once logged on, the user 102 is in a secure connection to the Real-Time-Social-Network™ 204 servers and can view a personal calendar summary, messages summary, and list of important links. The user 102 can also review and update a user personal profile.

Your Home

Your Home can allow the user 102 to preview what is going on in the user's own world. By contrast, a portal 104 tells the user what is happening in the outside world, or an organization's site tells you about itself. The "Your Home" site focuses on the individual's day-to-day routine and associations 208. That is, most people are part of many associations 208 whether they realize it or not. For example, they may be associated with a church, a parent-teacher organization, a work union, and workplace colleagues.

Through the use of the Real-Time-Social-Network™ 204, people and organizations can immediately share selected parts of their calendars, to-do lists, and phone directories (these can be synchronizable with common palm-pc's and personal digital assistant (PDA) personal information manager (PIM) software such as, e.g., a groupware application such as, e.g., Microsoft Outlook available from Microsoft Corporation from Redmond, Wash., U.S.A., Lotus Notes available from IBM Corporation from Armonk, N.Y., U.S.A., and/or GroupWise available from Novell Corporation from Provo, Utah, U.S.A.). In addition, announcements (or postcards) and letters (or newsletters) can be posted to one member of one family, or all members of one family, to all members of many families. In this way, the "Your Home" site deals with the day-to-day dynamics of life. (For example, Does anyone know Aunt Sally's phone? Who's doing carpool today? Can someone bring sodas to the potluck dinner? Don't forget the Parent-Teacher meeting tonight in the school's auditorium). All these questions and announcements are part of daily lives of users 102 and the "Your Home" site, through the use of the Real-Time-Social-Network™, can deliver updated versions to you 24 hours per day, 7 days per week.

Your Families

The Your Families portion of this site embraces the concept that all people simultaneously belong to more than one family. In addition to an immediate family, we all have extended family and friends, work family, social "club" family, religious family, and many other families.

This section of the RTSN 204 site can provide a free and easy way to interact with the members of one or many families on a daily basis by encouraging people to identify and define for themselves the families they belong to. A goal of the RTSN 204 is to humanize the Web so as to serve the real-life, day-to-day, complex and seemingly conflicting needs of people.

Your Families can also provide a powerful link for small organizations and non-profits to efficiently interact with their membership (as further discussed below).

Asking Questions

People ask questions every day. For many, getting an answer (let alone a correct one) would take hours surfing the Web. Some questions will have no answers on the Web given the uniquely personal nature of the question. Most people find answers to their questions by asking a trusted friend or relative, or may be a work colleague. A goal with the RTSN 204 site makes this process more efficient.

Using the Real-Time-Social-Network™ 204, groups or "families" can pose questions to each other, based on a unique filtering system.

Therefore a user 102 asking a question could determine:

Which "family" to ask the question to,

Is the question anonymous or not,

What attributes the answerer should have (i.e. professional, hobbyist, gender, age, etc.), The maximum number of responses they would like, and The expiration date of their question.

Likewise users 102 can decide whether they are willing to answer questions or not on subjects that interest them, based on a similar filtering system.

Associate business and organization members 208 could benefit from this component of the network by reducing the burden of their own product support and by having an avenue for people to ask questions about products and service.

For example, despite the proliferation of automotive Web sites and Web based resources, Consumer Reports (April 2000) found that most people still rely on a more subjective model for choosing a vehicle, " . . . our respondents told us that the most important sources of information influencing their choice of vehicle were still their previous experience with the manufacturer, visits to dealer showrooms, and advice from friends and relatives . . . ."

Keeping in Contact

The Your Families section allows groups of people to define themselves as a family and share selective information with one another. Common examples of families include: the people who live in a house, an extended family, a spouse's side of the family, bowling league buddies, a user's kid's little league team, workplace peers, a neighborhood association or block-watch, and a church.

Each family 220 can share selective portions of an up-to-date calendar, address/phone book, and to-do list, and can have the ability to send announcements, memos, postcards, letters on stationary, one-page newsletters, and notices of items for sale/trade/free.

The power and simplicity of this approach is that these notices are only delivered to an individual who wishes to receive them and only from site members. This essentially eliminates spamming and increases the personal trust in the veracity of the announcement.

In addition, the Real-Time-Social-Network™ 204 also can support simple online voting (Yes/No/Maybe/Abstain) for group decision-making.

The days of out-of-date contact information are history for site users 102 since a change in a shared phone listing can be seen by all members who are linked to that phone listing. That is, when a user 102 moves down the street, all the user's "families" 220 (e.g., relatives, clubs, and organizations) and associations 208 (see Your Associations below) with whom that information was shared can automatically be updated. This is especially important for wireless Web where an up-to-the-minute contact list can be useful.

Your Associations

Like the Your Families section above, the Your Associations section allows the user 102 to keep in sync with sponsoring associate 208 businesses and organizations that the user 102 associates with. For example, in the everyday life of the user 102, the user 102 forms an association with various entities of the user 102 such as, e.g., the service center of the user's car, user's child's pediatrician, user's pharmacist, and user's employer's human resource department. In essence, defined associations 208 can replace defined families. A difference is that an association 208 can sponsor the relationship and can provide a secure link to the user's personalized information. As is apparent from FIG. 4, this link to personalized information can be viewed as beneficial to the user customer 102 and as a sound business practice for the associate provider 208.

For example, suppose the user 102 has purchased a Ford Escort automobile. Since the auto manufacturer would like to keep up-to-date on the car's maintenance, Ford can sponsor the user purchaser's membership in the RTSN and can provide a secure link to real-time information that is specifically personalized for the car—advantageously a key to customer loyalty (see, e.g., FIG. 4).

On the other hand, some organizations can resell the organization's accounts to the organization's members. An example could be a sports team reselling memberships to diehard fans offering them information such as, e.g., "inside, up-to-the-minute, scoop" about the team and its players plus special membership benefits such as, e.g., an opportunity to lock in preferred seats.

In Your Associations section, an association 208 can allow its members to ask anonymous questions to the association 208 or, if they choose, to the association's membership (or, e.g., a subgroup). The feature enabling questions to other members is a valuable feature in reducing the burden and expense of product support calls. An example, the Town hall at www.edmunds.com has thousands of private postings about all manner of issues on every type of automobile. This is useful for www.edmunds.com but unfortunately Ford receives no credit for all the discussions about 1999 Ford Escorts. Ford misses the opportunity to cultivate loyal customers.

The RTSN 204 can work closely with associate providers 208 to help tailor use of the Real-Time-Social-Network™ to the benefit of the associates 208.

Exemplary Feature List

In one exemplary embodiment of the present invention, the RTSN 204 can include various features such as, e.g.:

A Family Account (for individuals and small organizations), including,
  ability to create multiple small "families,"
  ability to join "public families,"
  ability to ask questions (anonymously or not) to members of their families (or public families accepting questions),
  ability to make announcements to "families,"
  ability to post items for sale/barter/give-away to "families,"
  ability to send letters and postcards to "families,"
  ability to send one page newsletters to "families,"
  personal/shared (with selected families) calendar entries,
  personal/shared (with selected families) phone book entries,
  personal/shared (with selected families) to-do list entries,
  voting buttons, and
  free;
An Associate Provider's Account, including,
  All features of the "Family" account plus:
  ability to create "families/associations" with large numbers of members,
  ability to "push" individualized content into the member's namespace,
  logo is displayed on the association display panel and announcements,
  link to branded and personalized content page,
  3 MB of server storage per customer account, and
  paid.

Portal providers have attempted to address the needs of users 102. Unfortunately, their efforts have all fallen short.

The portal's philosophy has always been a "shotgun" approach. That is, since portals did not know what interested the user 102 they offered links or selectable links to everything possible, from national news, local news, stock reports, weather, etc.

However, with all this information the portals have still failed to grasp what is important to the day-to-day existence of the average user 102. The portals offer lots of splash & flash, which can capture a user's imagination for a while, but not for a long while. Portal fatigue is inevitable because it does not address what most average users need on a daily basis.

While portals are designed for retention it is very easy for a user to switch from using one portal to another. Often a user changes their portal simply because they bought a new computer with a different default home page.

The "Reverse Portal™" approach of RTSN 204 can give associate 208 businesses and organizations what they desire above all, the ability to be part of a user's inner circle, an added value to their daily routine. In essence, the RTSN 204 is not a matchmaker (as is the portal), but instead, once the customer/business relation exists, RTSN 204 provides the glue for a long-term relationship.

The RTSN 204 offers users a base from which to check what is happening in their daily lives. By integrating the many facets of the user's lives they can begin to rely on the RTSN 204 several times a day.

Other Information

Because the Real-Time-Social-Network™ 204 is social by its very nature, the RTSN 204 leads to daily use and allows sponsoring associates 208 to become part of a user customer's social/family circle. This business-customer relationship is not conventionally found on the Web.

The business model of the RTSN 204 can generate revenue in at least two ways. Primarily through paid associate 208 customer accounts (which can be purchased in bulk by businesses and large organizations for each of their customers/members) and secondly through sponsorships and advertisements.

The RTSN 204 model is ideal for wireless Web since RTSN 204 does not rely on advertisements for revenue. As wireless Web devices become more popular RTSN 204 expects associate 208 accounts to rise to even greater numbers while advertisement impressions drop due to lack of "real estate" inherent on displays of most portable Web devices. We also expect ad impressions to drop as more users 102 become sponsored members through paid associations 208.

The RTSN 204 model is advantageous in that users 102 generate revenue each time they patronize an associate 208 company that has signed on as an associate provider 208. For example, (when user 102, John Smith, buys a Ford and opts to use this site.) Thus, the user's relationship with Ford results in revenue to the RTSN 204. The user's other various relationships all can generate revenue from multiple associate revenue streams.

Below is an illustrative sample list of example activities that users 102 such as, e.g., members of organizations, employees of companies, school staff and students, and clubs, might perform with Real-Time-Social-Network™ 204:
  organize events, including,
    shared scheduling,
    shared To-Do lists,
    shared Who-Brings-What lists,
    shared up-to-date membership lists,
    automated reminders, and
    finding and assigning volunteers;
  answering questions (anonymously or not), including,
    advice from other members,
    advice from leadership,
    sharing ideas with other likeminded organizations,
    communicating with parent organizations, and
    getting expert opinions on various subjects;
  create inner networks for youth groups, sisterhoods, men's clubs, PTO's, etc.;
  newsletters and announcements;
  carpooling schedules;
  classified ads and e-garage sales; and
  posting confidential messages to individuals.

Figure 7:
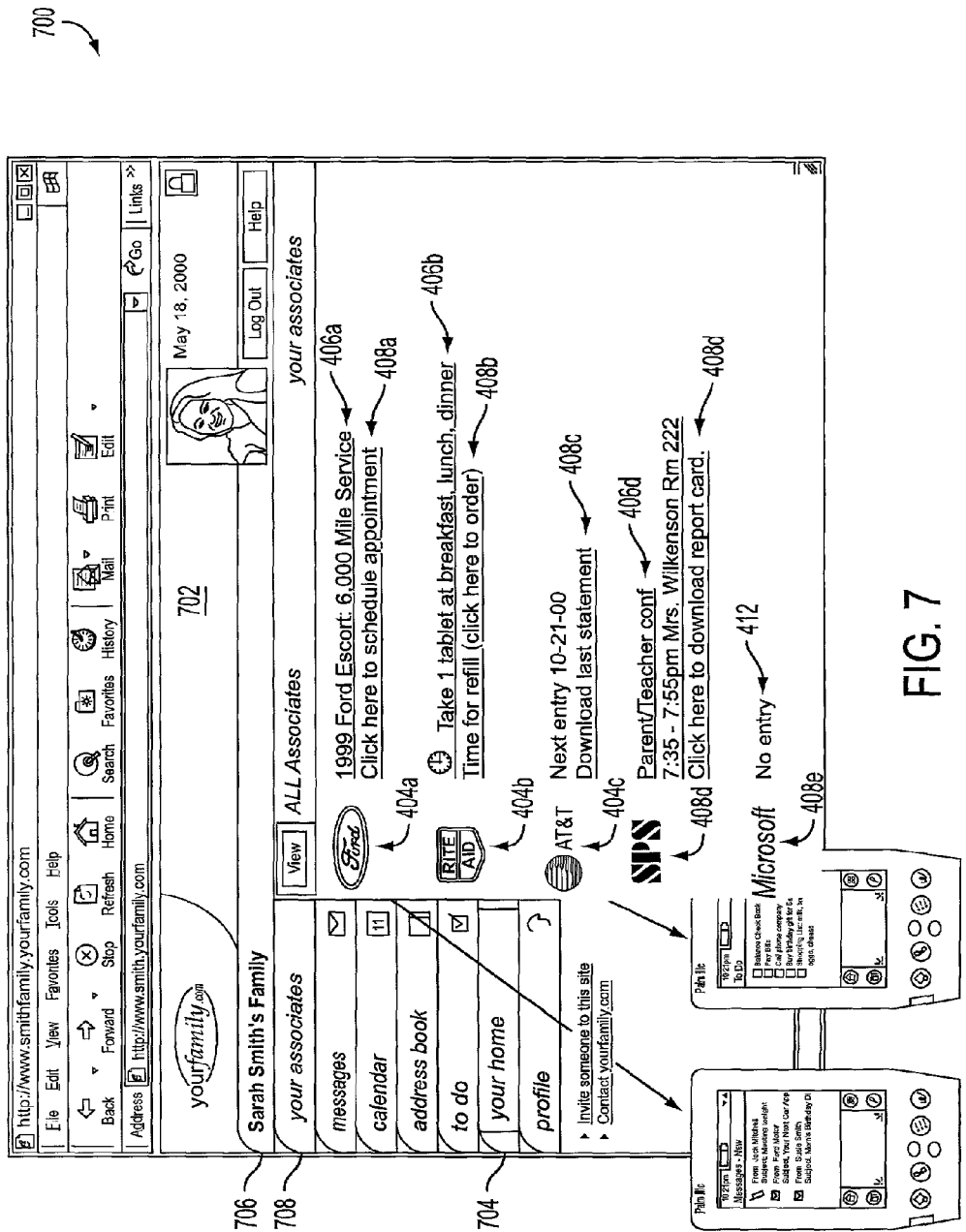
FIG. 7 depicts an exemplary embodiment of an associate providers list view user interface according to the present invention.
Figure 8:
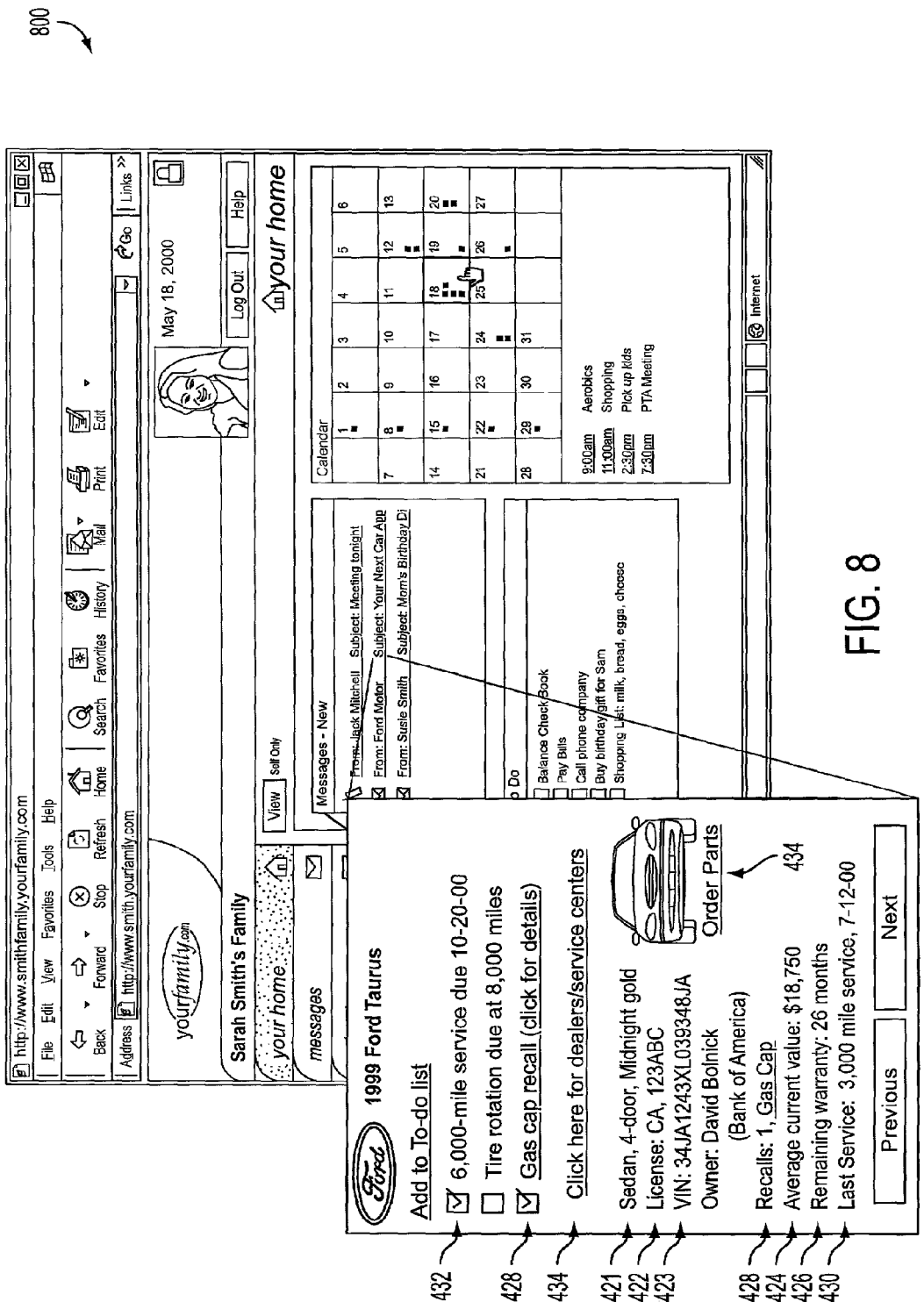
FIG. 8 depicts an exemplary embodiment of an associate provider pop-up window illustrating a personalized customer information record according to the present invention.

FIGS. 6-17 depict exemplary embodiments of illustrative examples of graphical user interfaces (GUIs) that can be part of the RTSN 204 of the present invention. FIGS. 6-10 illustrate exemplary features of the Real-Time-Social-Network™ 204 such as, e.g.:
  a simplified user interface that is suited for 95% of computer users;
  a user interface that is easily ported to a small footprint device (e.g. Palm Pilot or wireless Web devices)(see FIGS. 9, 14);
  a user interface that can be integrated into an operating system desktop (see FIG. 15);
  a user interface that can be integrated into groupware such as, e.g., Microsoft Outlook (see FIGS. 13A and 10);
  associate providers inserted into the user's to-do list (see also FIG. 6);
  a user interface that can be integrated into an instant messenger service such as, e.g., AOL instant messenger or Microsoft Instant messenger (see FIG. 17);

persistent branding (see FIG. 7);
a user interface that can be integrated into an in-flight entertainment (IFE) portal (see FIG. 16);
appropriate links to order products or services or for additional information (see FIGS. 6, 7 and 8); and
personalized, branded, up-to-the-minute information that can be viewed (see pop-up window in FIG. 8).

FIG. 7 depicts a block diagram 700 illustrating an exemplary embodiment of an associate providers list view 702 user interface in an exemplary web-based version of the present invention, including a your associates tab 708 and tabs to other functions.

FIG. 8 depicts a block diagram 800 illustrating an exemplary embodiment of an associate provider pop-up from a your home tab of an exemplary web-based version of the RTSN user interface, showing personalized customer information. Specifically, an automotive service interface is shown in the exemplary pop-up window, after selection of a Personnel Information Report Channel (PIRC).

Figure 9:
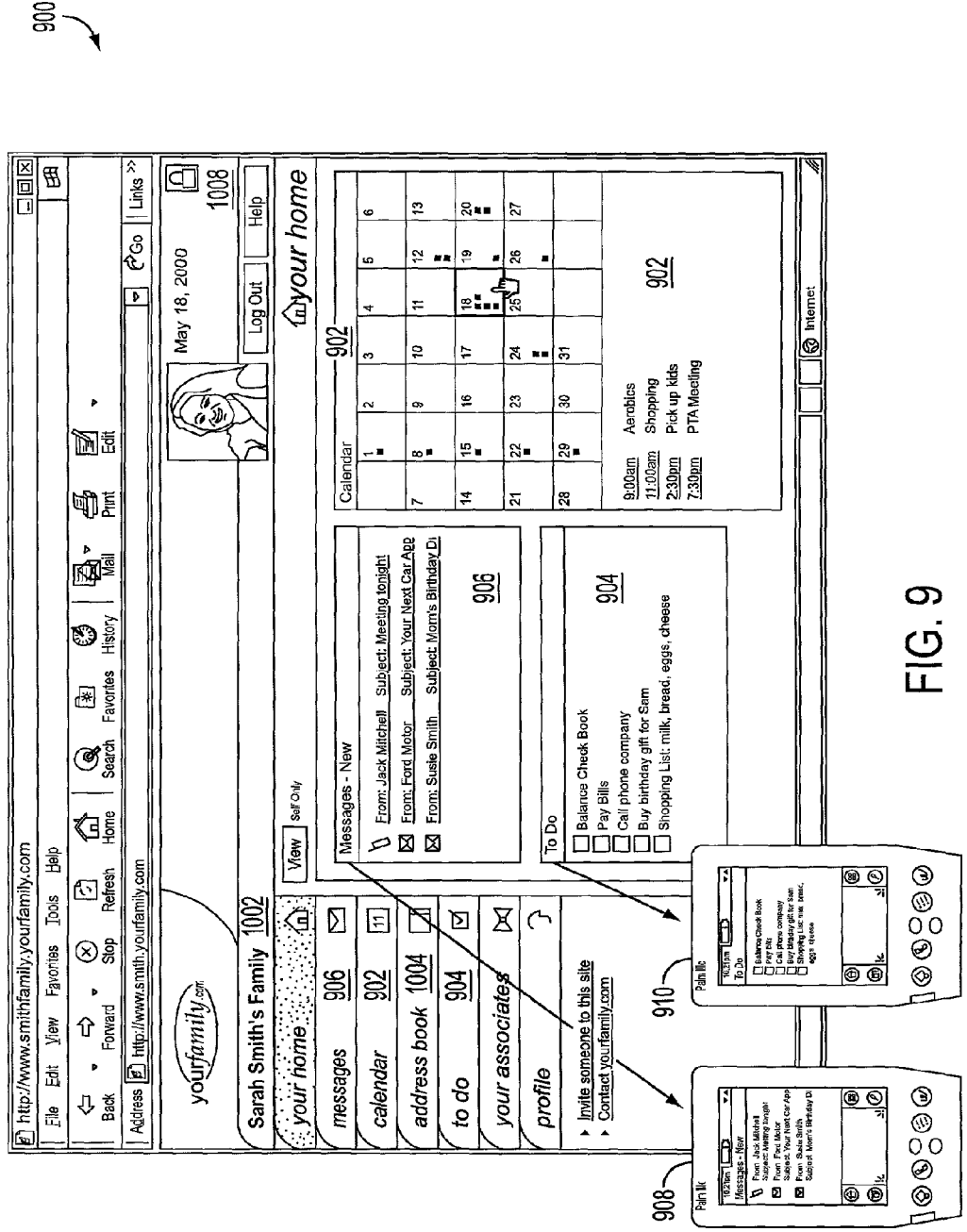
FIG. 9 depicts an exemplary embodiment of a user interface illustrating a user's summary home page exemplary access device views of a RTSN according to the present invention.

FIG. 9 depicts a block diagram 900 illustrating an exemplary embodiment of a user interface illustrating an exemplary web-based version of a user's summary "your home" home page of a RTSN 204 of the present invention. The view can include, e.g., new messages 906, a to-do list 904, and a calendar 902. FIG. 9 also illustrates interfaces easily ported to a personal digital assistant (PDA) 908, 910.

Figure 10:
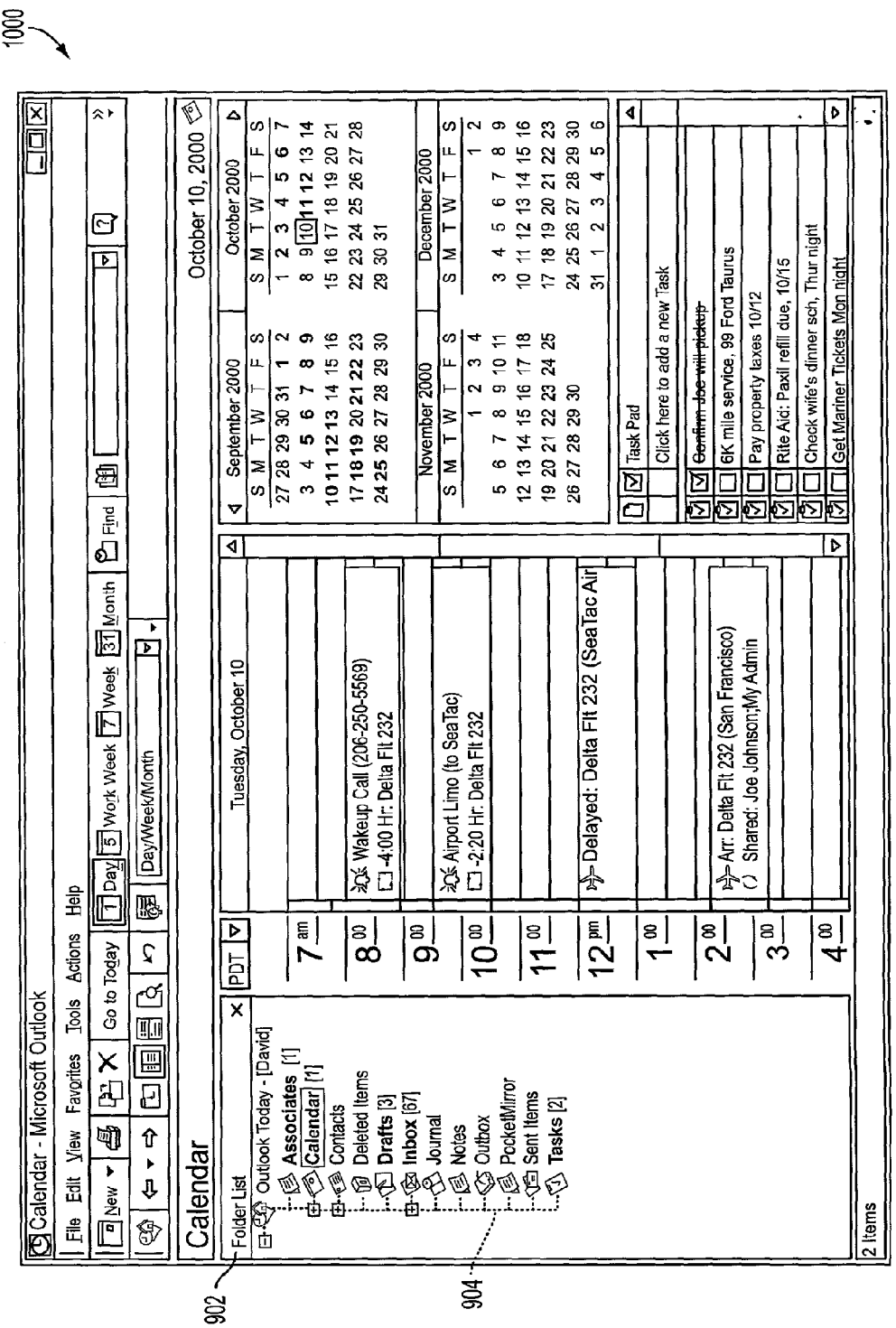
FIG. 10 depicts an exemplary embodiment of a user interface illustrating a user's calendar according to the present invention.

FIG. 10 depicts a block diagram 1000 illustrating an exemplary embodiment of a user interface illustrating a user's calendar 902 and a task list 904 of the present invention. The exemplary view illustrates the calendar integrated into a groupware application such as, e.g., Microsoft Outlook or Lotus Notes. Shared calendar entries and relative time entry tasks are also illustrated.

Figure 11:
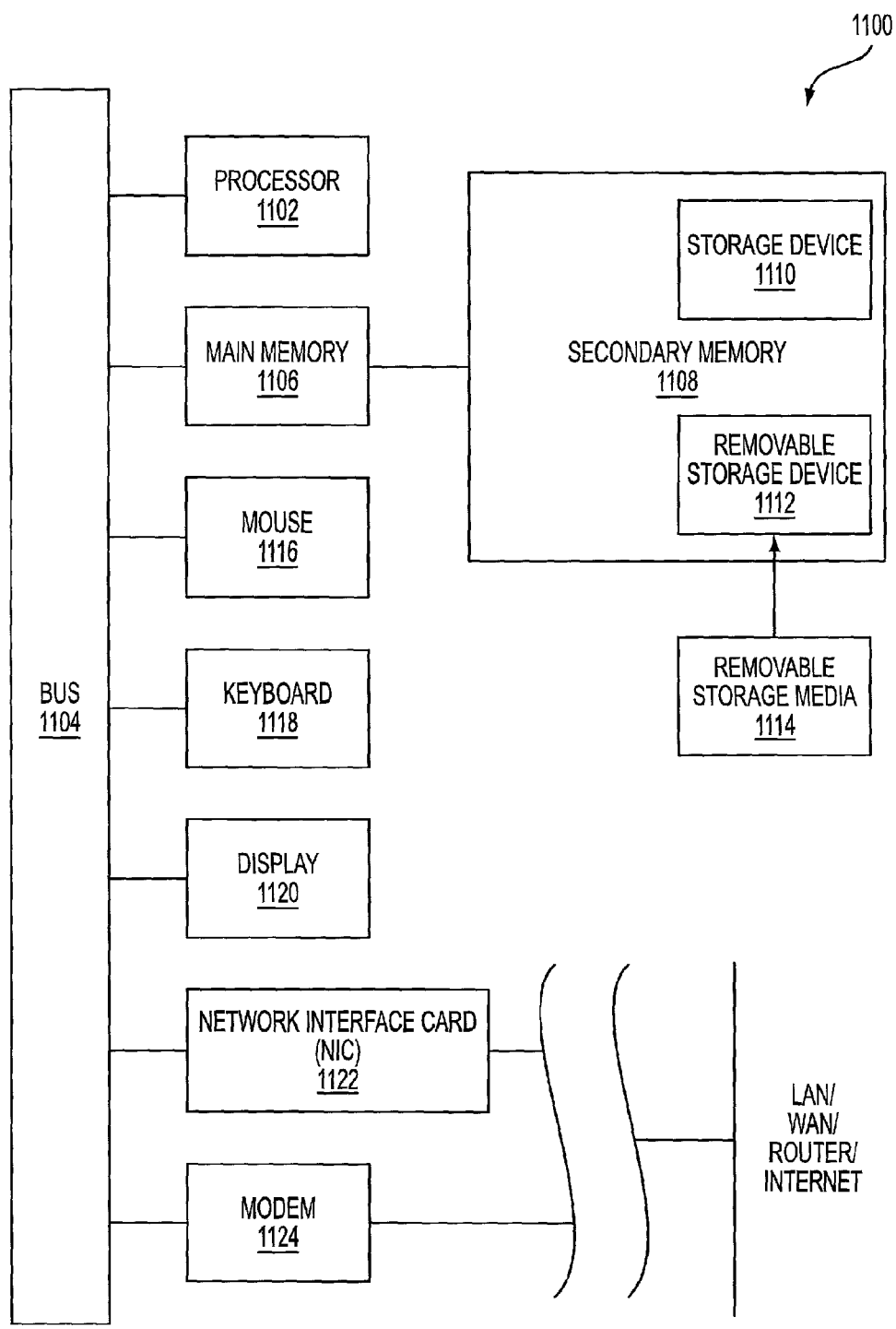
FIG. 11 depicts an exemplary embodiment of a computer system which can be used as any computing device such as a client or server computer according to the present invention.

FIG. 11 depicts a block diagram 1100 illustrating an exemplary embodiment of a computer which can be used as a client 148, 170 or server computer 156, 158, for example, of the present invention.

Figure 12:
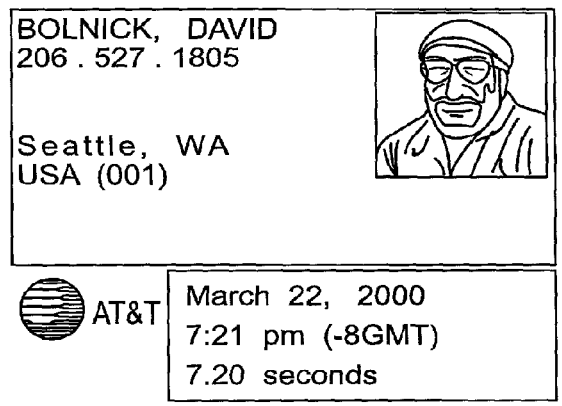
FIG. 12 depicts an exemplary embodiment of a voicemail including a graphical image that could be a shared file which could be included as an example union of pushed information and personal information message according to the present invention.

FIG. 12 depicts a block diagram 1200 illustrating an exemplary embodiment of a voicemail including a graphical image that could be a shared file which could be included as an example union of pushed information and personal information message of the present invention.

Figure 13A:
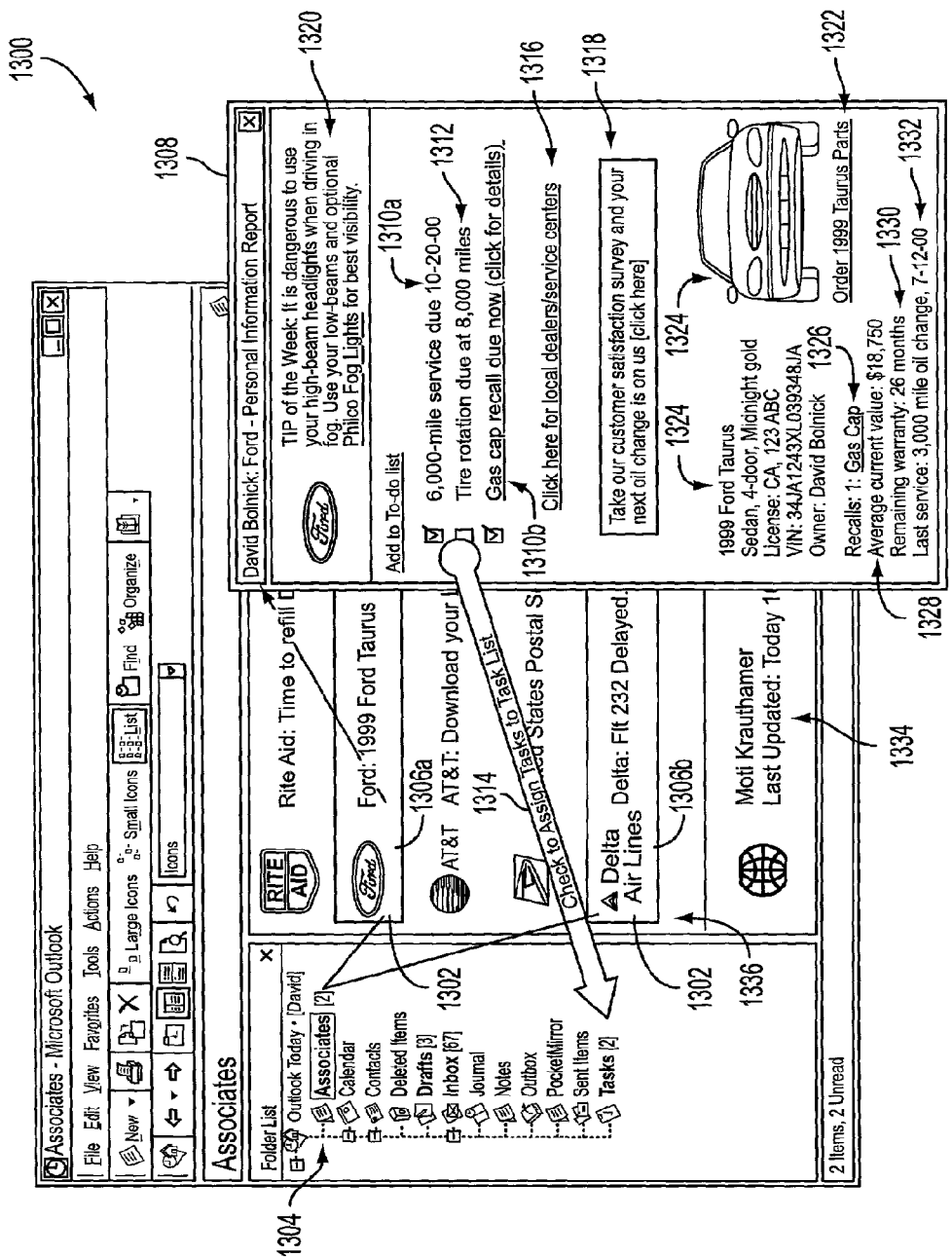
FIG. 13A depicts an exemplary embodiment of an association list window integrated into an exemplary groupware application including a window illustrating a personal information report (PIR) according to the present invention.

FIG. 13A depicts a diagram 1300 of an exemplary embodiment of a graphical user interface of an exemplary Associates' list 1336 integrated into a groupware application such as, e.g., Microsoft Outlook, Novell Groupwise, or IBM/Lotus Notes. The associates' list 1336 depicts graphically that two associates 1306a and 1306b have new unviewed content 1302. The associates' list 1336 can also include preferences, profiles and status 1334. The folder list of the groupware application can also include an associates' folder 1304. User 102 selection of automobile service associate icon 1306a can open pop-up window 1308. User 102 selection of additional to-do list items 1310a and 1310b can automatically add the two task items 1310a, 1310b to the task list folder as illustrated by arrow 1314. Further personalized information 1324 is depicted. For example, a recall 1326 of a gas cap is provided, which could have been provided directly from the associate 208 or from an agency such as, e.g., the consumer product protection agency (CPPA). An average current value 1328, remaining warranty period 1330, a recent service 1332, customer satisfaction survey 1318, parts ordering link 1322, service dealer link 1316, other unselected tasks 1312 and a tip of the week 1320 can also be provided.

Figure 13B:
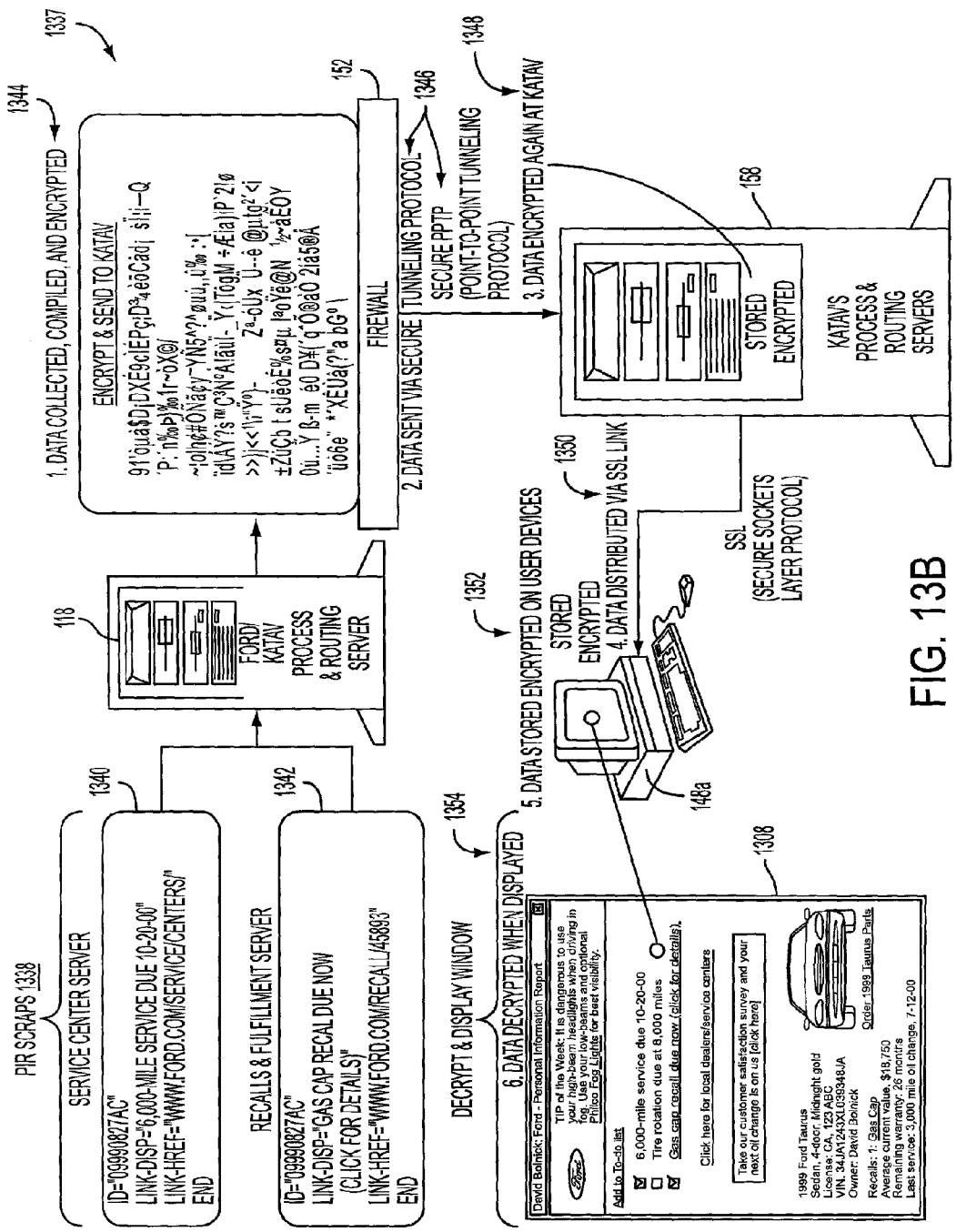
FIG. 13B depicts an exemplary embodiment of a redundant security transport (RST) architecture according to the present invention.

FIG. 13B depicts an exemplary embodiment of a flow diagram 1337 illustrating a redundant security transport (RST) process beginning with, e.g., a personal information record (PIR) scraps 1338 of tasks from associates 208. In the exemplary embodiment an automotive service associate can provide from a service center server a 6,000 mile service task 1340 illustrated in FIG. 13B, as task 1310a and from a recalls and fulfillment server 1342, a gas cap recall 1342 illustrated as task 1310b in FIG. 13A. The tasks can be forwarded as shown to a process and routing server 118. From the process and routing server 118, the data can be collected, compiled, and encrypted as shown in step 1344 in, e.g., a firewall 152. The data can then be sent via a secure tunneling protocol such as Windows NT's secure point-to-point tunneling protocol (PPTP) as illustrated in step 1346. In step 1348, the data can be received at a process and routing server 158 where the data as illustrated, can be encrypted again and stored. Using a secure sockets layer protocol (SSL), as illustrated in step 1350, the data can be distributed via an SSL link to the user 102 at a computer system 148a as shown. In step 1352, the data can again be stored encrypted on the user device 148a of the user 102. Finally when user 102 accesses the data as illustrated in FIG. 13A, the data can be decrypted and displayed in a pop-up window 1328 as shown in step 1354.

Figure 14:
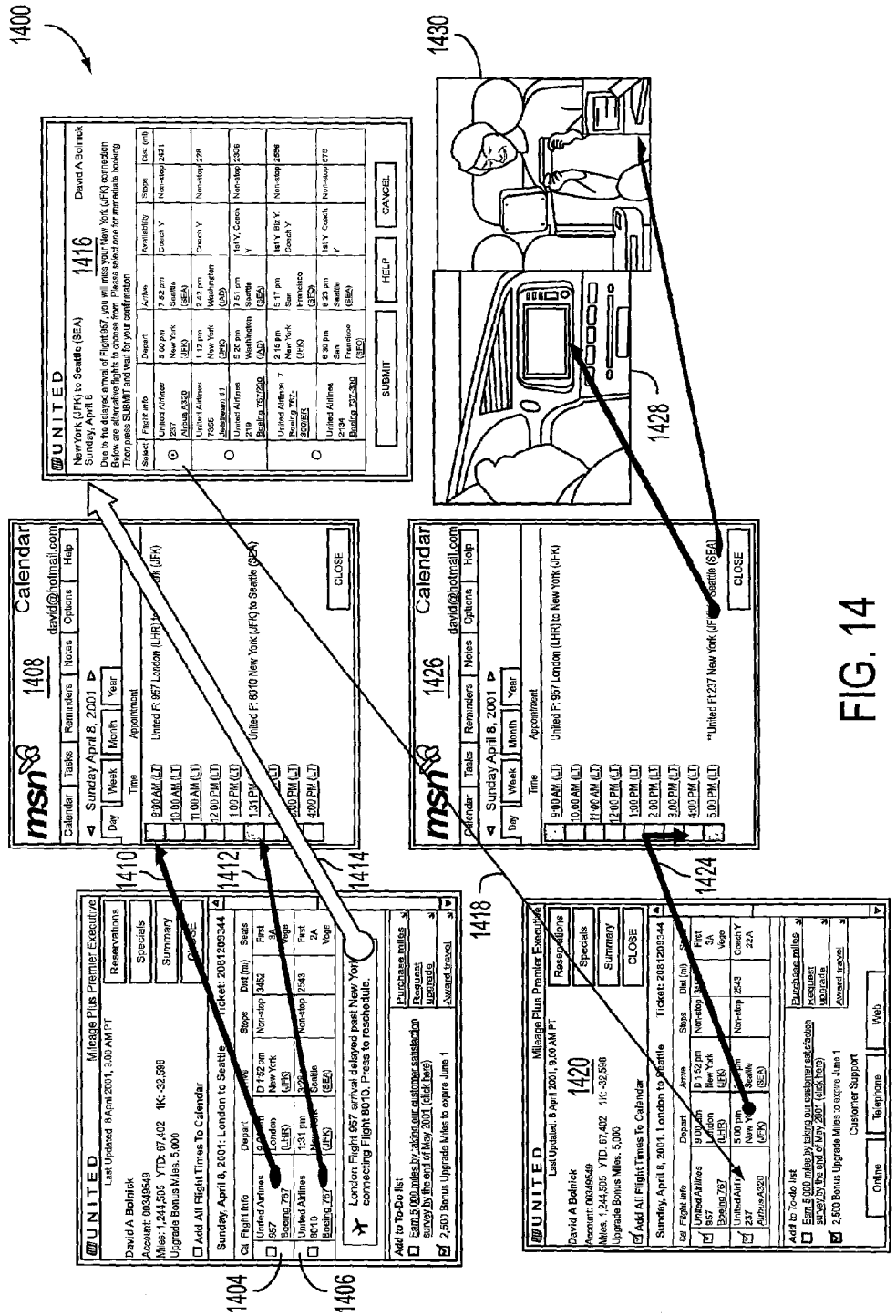
FIG. 14 depicts an exemplary embodiment of a travel reservation personal information record (PIR) integrated with a portal's calendar function, illustrating adjusting a flight schedule to avoid a delay according to the present invention.

FIG. 14 depicts an exemplary embodiment of a flow diagram 1400 illustrating a flight reservation window from which a user 102 could select a one way trip from London to Seattle. If user 102 selects items 1404 and 1406, using an exemplary reservation system as illustrated, the flightlegs can be automatically inserted as shown as calendar 1408 entries 1410 and 1412. Suppose the User 102 is viewing the shown reservation window from an in-flight entertainment (IFE) portal such as, e.g., that shown in FIG. 16. Suppose a delay notice appears, the user 102 can as shown by step 1414, select the delay notice and open pop-up window 1416 providing alternative flight arrangements. If user 102 selects a flight as shown in step 1418, then the new flight leg can be automatically entered using window 1420 to update calendar 1424 which can be viewed enroute in a vehicle information system 1428 or in-flight as shown in view 1430.

Figure 15:
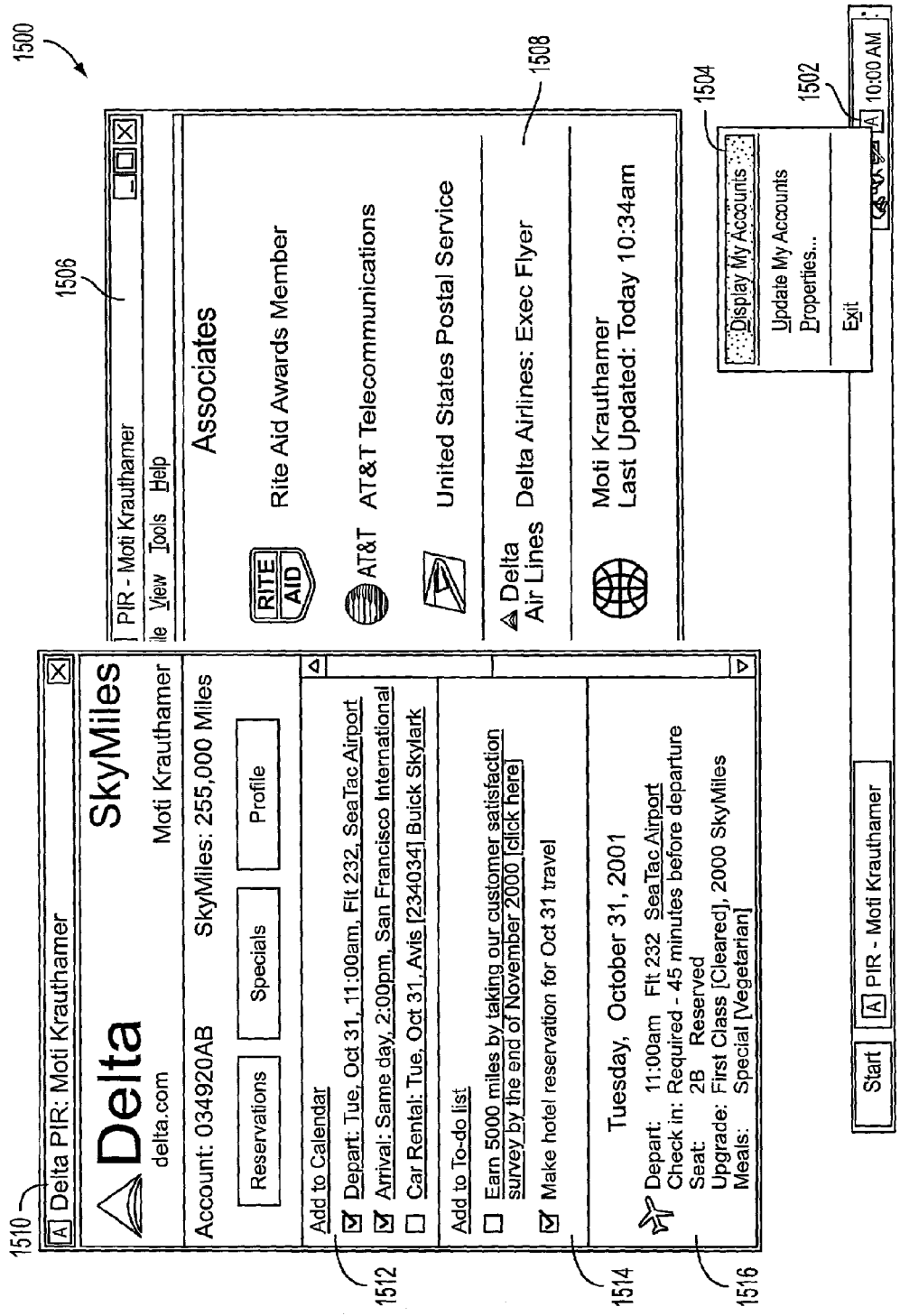
FIG. 15 depicts an exemplary embodiment of a user interface illustrating an operating system tray based alert and application based version of an associates list and PIR according to the present invention.

FIG. 15 depicts an exemplary embodiment of a block diagram 1500 of an exemplary graphical user interface of an associates list personal information report (PIR) accessible as a standard application from an operating system desktop. In an exemplary embodiment an icon 1502 that can be placed in the system tray can provide a visual display to notify the user 102 of new content received. Suppose new content such as, e.g., airline service information 1508 is received. The system tray icon 1502 can be made to blink, or change otherwise in appearance, to alert the user 102 of new content. The user 102 can then activate the appearance, to alert the user 102 of new content. The user 102 can then activate the application based account list using a pop-up menu list such as e.g., the menu shown including display accounts menu item 1504. When selected, menu item 1504 can be used to open an associates' accounts list window 1506 which can provide a highlight 1508 to point out to the user 102 which associate 1508 has new content. Selection of highlight 1508 can open an application 1510 associated with the selected airline service associate. The user 102 can select items 1512 to automatically add the appointments to a calendar of user 102. The user 102 can also select items 1514 to automatically add the items to the to-do list of user 102. PIR 1510 can also include, in an exemplary embodiment, reservation information 1516.

In one exemplary embodiment, the associates' list can be a separate application, as shown. In another exemplary embodiment, the associates' list application can be integrated directly into the operating system.

Figure 16:
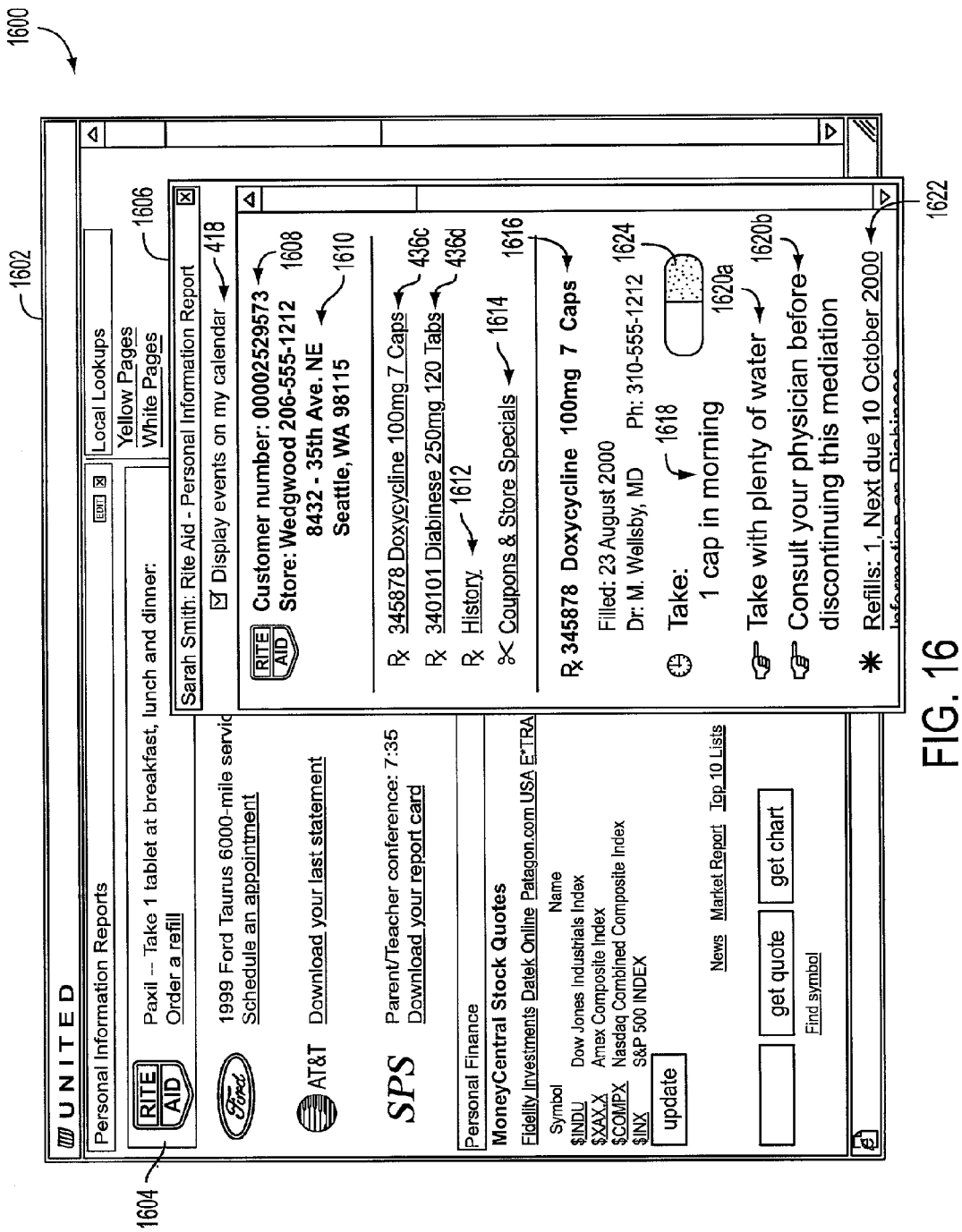
FIG. 16 depicts an exemplary embodiment of a user interface for an in-flight entertainment (IFE) portal according to the present invention.

FIG. 16 depicts an exemplary embodiment of a block diagram 1600 illustrating an associates' list integrated into a portal 1602. Specifically, the block diagram 1600 depicts the associates' list integrated into an in-flight entertainment (IFE) portal 1602. New content can be shown by highlight 1604, allowing the user 102 to select the new content associate icon 1604, which in the exemplary embodiment can be for a pharmacist. Selection of the pharmacy associate icon 1604 can open pop-up window 1606. Pharmacy PIR 1606 includes, in an exemplary embodiment, a customer number 1608, a store identifier 1610, current prescriptions 436c, 436d, pharmacy history 1612, store specials and coupons 1614, and various exemplary specific information and instructions 1616-1622 for prescriptions 436.

Figure 17:
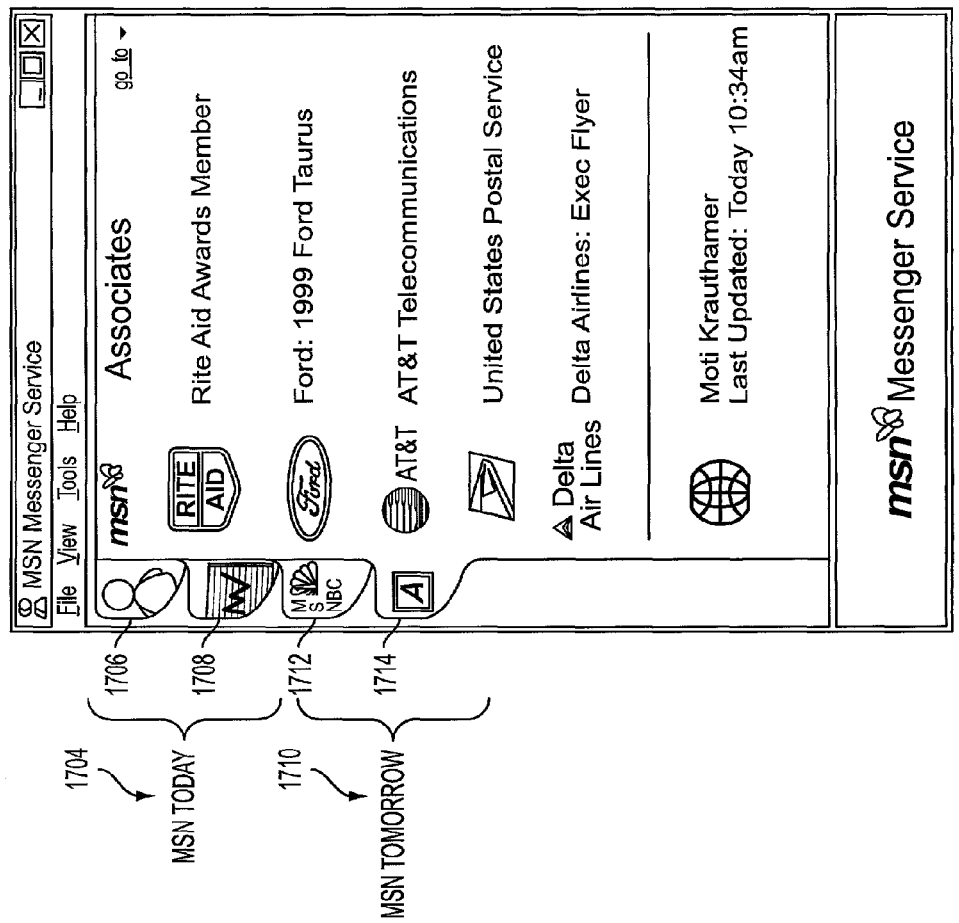
FIG. 17 depicts an exemplary embodiment of a user interface of an instant messenger including an exemplary associates list according to the present invention.

FIG. 17 depicts an exemplary embodiment of a block diagram 1700 illustrating a graphical user interface 1702 illustrating an associates' list integrated into an instant messenger service. In the exemplary figure, current tools 1704 of a Microsoft Instant messenger service can be shown including tabs 1706 and 1708. In an exemplary embodiment additional tools 1710 can be included. Additional tools 1712, 1714 can include a tab for accessing MSNBC 1712, and the RTSN Associates' list 1714, respectively. As will be apparent to those skilled in the relevant art, although the exemplary GUI 1702 uses an MSN Messenger Service instant messenger, other instant messaging applications could similarly include an associates' list 1714 integrated into them such as, e.g., AOL Instant Messenger and ICQ.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system, comprising:
one or more computer devices configured to:
store account information corresponding to a plurality of accounts of an information distribution service, wherein the stored account information includes information indicating a plurality of groups to which various ones of the plurality of accounts belong;
receive, from a client device, a request to access a first account; and
in response to determining that the request is valid, generating a report for the first account, wherein the generating includes selecting information based in part on a time-based criterion, wherein the selected information includes:
personal information obtained from a second account, wherein the personal information from the second account is selected based in part on the information distribution service that stores account information indicating that the first account belongs to a group that includes the second account; and
a message obtained from a third account, wherein the message is addressed to the first account, and wherein the message is selected based in part on the information distribution service that stores account information indicating that the first account belongs to a group that includes the third account, wherein the second account and the third account are not a same account; and
provide the report that includes the selected information to the client device for display.

2. The system of claim 1, wherein the system is configured to provide the report to the client device in response to the client device logging on to the first account.

3. The system of claim 1, wherein the system is configured to provide the report over a wireless network to the client device.

4. The system of claim 1, wherein the system is configured to provide the report over a television network to the client device.

5. The system of claim 1, wherein the personal information from the second account includes one or both of a calendar entry and an announcement, wherein the personal information from the second account is broadcast to other accounts of the group that includes the second account, and wherein the personal information from the second account is broadcast without being addressed by the second account to the other accounts of the group that includes the second account.

6. The system of claim 1, wherein the system is web-based, and wherein the system further comprises a web server that is configured to provide the report to the client device via one or more web pages.

7. The system of claim 1, wherein the system is further configured to include additional content as part of the report for the first account, wherein the additional content includes public information generated by the system based upon user profile information specified for the first account.

8. The system of claim 7, wherein the additional content included in the report for the first account includes information based on location information specified for the first account.

9. The system of claim 1, wherein the message is not addressed to other accounts of the group that includes the third account, and wherein the message is not made accessible to the other accounts of the group that includes the third account.

10. The system of claim 9, wherein the report further includes a second message that is addressed to all accounts of the group that includes the third account, and wherein the second message is made accessible to all the accounts of the group that includes the third account.

11. The system of claim 1, wherein the group that includes the first account and the second account is also the group that includes the first account and the third account.

12. The system of claim 1, wherein based in part on the information distribution service that stores account information indicating that the first account belongs to a group that includes the second account, the information distribution service broadcasting personal information from the first account to the second account.

13. A method, comprising:
a computer system storing account information corresponding to a plurality of accounts of an information distribution service, wherein the stored account information includes information indicating a plurality of groups to which various ones of the plurality of accounts belong;
the computer system receiving, from a client device, a request to access a first account;
in response to determining that the request is valid, the computer system generating a report for the first account, wherein the generating includes selecting information based in part on a time-based criterion, and wherein the selected information includes:
personal information obtained from a second account, wherein the personal information from the second account is selected based in part on the information distribution service that stores account information indicating that the first account belongs to a group that includes the second account; and a message obtained from a third account, wherein the message is addressed to the first account, and wherein the message is selected based in part on the information distribution service that stores account information indicating that the first account belongs to a group that includes the third account, wherein the second account and the third account are not a same account; and providing the report that includes the selected information to the client device for display.

14. The method of claim 13, further comprising providing the report to the client device in response to the client device logging on to the first account.

15. The method of claim 13, wherein the method is web-based, and wherein the method further comprises providing the report to the client device via one or more web pages.

16. The method of claim 13, wherein the personal information from the second account includes one or both of a calendar entry and an announcement, and wherein the personal information from the second account is broadcast to other accounts of the group that includes the second account, and wherein the personal information from the second account is broadcast without being addressed by the second account to other accounts of the group that includes the second account.

17. The method of claim 13, further comprising including additional content as part of the report for the first account, wherein the additional content includes public information generated by the method based upon user profile information specified for the first account.

18. The method of claim 17, wherein the additional content included in the report for the first account includes information based on location information specified for the first account.

19. The method of claim 13,
wherein the message is not addressed to other accounts of the group that includes the third account, and wherein the message is not made accessible to the other accounts of the group that includes the third account; and
wherein the report further includes a second message that is addressed to all accounts of the group that includes the third account, and wherein the second message is made accessible to all the accounts of the group that includes the third account.

20. A non-transitory computer-usable medium having instructions stored thereon that, in response to execution by a computing device, cause the computing device to perform operations comprising:
storing account information corresponding to a plurality of accounts of an information distribution service, wherein the stored account information includes information indicating a plurality of groups to which various ones of the plurality of accounts belong;
receiving, from a client device, a request to access a first account; and
in response to determining that the request is valid, generating a report for the first account, wherein the generating includes selecting information based in part on a time-based criterion, and wherein the selected information includes:
personal information obtained from a second account, wherein the personal information from the second account is selected based in part on the information distribution service that stores account information indicating that the first account belongs to a group that includes the second account; and
a message obtained from a third account, wherein the message is addressed to the first account, and wherein the message is selected based in part on the information distribution service that stores account information indicating that the first account belongs to a group that includes the third account, wherein the second account and the third account are not a same account;
and providing the report that includes the selected information to the client device for display.

21. The non-transitory computer-usable medium of claim 20, wherein the operations further comprise providing the report to the client device in response to the client device logging on to the first account.

22. The non-transitory computer-usable medium of claim 20, wherein the operations further comprise providing the report to the client device via one or more web pages.

23. The non-transitory computer-usable medium of claim 20, wherein the personal information from the second account includes one or both of a calendar entry and an announcement, and wherein the personal information from the second account is broadcast to other accounts of the group that includes the second account, and wherein the personal information from the second account is broadcast without being addressed by the second account to the other accounts of the group that includes the second account.

24. The non-transitory computer-usable medium of claim 20, and wherein the operations further comprise including additional content as part of the report for the first account, wherein the additional content includes public information generated by the computing device based upon user profile information specified for the first account.

25. The non-transitory computer-usable medium of claim 24, wherein the additional content included in the report for the first account includes information based on location information specified for the first account.

26. The non-transitory computer-usable medium of claim 20,
wherein the message is not addressed to other accounts of the group that includes the third account, and wherein the message is not made accessible to the other accounts of the group that includes the third account; and
wherein the report further includes a second message that is addressed to all accounts of the group that includes the third account, and wherein the second message is made accessible to all the accounts of the group that includes the third account.

* * * * *